United States Patent
Murai et al.

(10) Patent No.: US 9,633,189 B2
(45) Date of Patent: Apr. 25, 2017

(54) INFORMATION PROCESSING APPARATUS CAPABLE OF AUTHENTICATION PROCESSING WITH IMPROVED USER CONVENIENCE, CONTROL PROGRAM FOR INFORMATION PROCESSING APPARATUS, AND RECORDING MEDIUM HAVING CONTROL PROGRAM FOR INFORMATION PROCESSING APPARATUS RECORDED THEREON

(71) Applicant: Konica Minolta, Inc., Chiyoda-ku (JP)

(72) Inventors: Chiho Murai, Yao (JP); Motohiro Asano, Osaka (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/200,907

(22) Filed: Mar. 7, 2014

(65) Prior Publication Data

US 2014/0189833 A1 Jul. 3, 2014

Related U.S. Application Data

(62) Division of application No. 12/797,884, filed on Jun. 10, 2010, now Pat. No. 8,713,648.

(30) Foreign Application Priority Data

Jun. 15, 2009 (JP) ................................. 2009-142282

(51) Int. Cl.
*G06F 21/36* (2013.01)
*G06F 21/30* (2013.01)
(Continued)

(52) U.S. Cl.
CPC ............ *G06F 21/36* (2013.01); *G06F 21/305* (2013.01); *H04L 9/3226* (2013.01); *H04L 63/08* (2013.01);
(Continued)

(58) Field of Classification Search
CPC ........ G06F 21/305; G06F 21/36; G06F 21/44; H04L 63/08; H04L 9/3226;
(Continued)

(56) References Cited

U.S. PATENT DOCUMENTS

| 6,711,681 B1 | 3/2004 | Al-Salqan et al. |
| 6,718,471 B1 | 4/2004 | Kashima |

(Continued)

FOREIGN PATENT DOCUMENTS

| JP | 9-326922 A | 12/1997 |
| JP | 11-175726 A | 7/1999 |

(Continued)

OTHER PUBLICATIONS

Office Action issued on May 7, 2013 by Japan Patent Office in corresponding Japanese Patent Application Publication No. 2009-142282, and English translation thereof.

(Continued)

*Primary Examiner* — Amir Mehrmanesh
(74) *Attorney, Agent, or Firm* — Buchanan Ingersoll & Rooney PC

(57) ABSTRACT

An information processing apparatus determines whether a device accesses a box region of the information processing apparatus. When it is determined that the box region is accessed, a box ID entry screen is displayed on the device. The information processing apparatus determines whether a box ID is entered by a user of the device. If it is determined that a box ID is entered, then device information about the device is obtained. After the device information is obtained, the information processing apparatus determines whether the device possesses a hardware keyboard. If it is determined that the device possesses a hardware keyboard, a password authentication screen is displayed on the device. If it is determined that the device does not possess a hardware (Continued)

keyboard, an image authentication screen is displayed on the device.

13 Claims, 26 Drawing Sheets

(51) Int. Cl.
    *H04L 29/06*     (2006.01)
    *H04N 1/44*     (2006.01)
    *H04L 9/32*     (2006.01)
    *G06F 21/44*     (2013.01)

(52) U.S. Cl.
    CPC ......... *H04N 1/4413* (2013.01); *H04N 1/4433* (2013.01); *G06F 21/44* (2013.01); *G06F 2221/2129* (2013.01); *H04L 2209/08* (2013.01); *H04L 2209/80* (2013.01); *H04L 2463/082* (2013.01)

(58) Field of Classification Search
    CPC ............ H04L 2209/80; H04L 2209/08; H04N 1/4413; H04N 1/4433
    USPC ...... 726/2–7, 19; 713/176, 182–186; 705/67
    See application file for complete search history.

(56) References Cited

U.S. PATENT DOCUMENTS

| | | | |
|---|---|---|---|
| 8,910,274 B2* | 12/2014 | Sanders | 726/19 |
| 2002/0129284 A1 | 9/2002 | Kobayashi | |
| 2003/0115154 A1 | 6/2003 | Anderson et al. | |
| 2004/0153656 A1 | 8/2004 | Cluts et al. | |
| 2005/0044425 A1 | 2/2005 | Hypponen | |
| 2005/0268104 A1 | 12/2005 | Sugishita et al. | |
| 2006/0165263 A1 | 7/2006 | Niitsuma | |
| 2008/0155662 A1 | 6/2008 | Vykunta | |
| 2008/0172556 A1 | 7/2008 | Ishikawa et al. | |
| 2009/0232351 A1* | 9/2009 | Kagitani et al. | 382/100 |
| 2010/0043062 A1* | 2/2010 | Alexander et al. | 726/6 |
| 2012/0011564 A1* | 1/2012 | Osborn et al. | 726/2 |
| 2012/0159593 A1* | 6/2012 | Griffin et al. | 726/7 |
| 2013/0329970 A1* | 12/2013 | Irie et al. | 382/118 |

FOREIGN PATENT DOCUMENTS

| | | |
|---|---|---|
| JP | 11-345206 A | 12/1999 |
| JP | 2001-305968 A | 11/2001 |
| JP | 2001-313913 A | 11/2001 |
| JP | 2002-171252 A | 6/2002 |
| JP | 2002-268767 | 9/2002 |
| JP | 2002-289967 A | 10/2002 |
| JP | 2003-099404 A | 4/2003 |
| JP | 2005-031730 A | 2/2005 |
| JP | 2006-072833 | 3/2006 |
| JP | 2006-202212 A | 8/2006 |
| JP | 2006-302000 A | 11/2006 |
| JP | 2007-264892 A | 10/2007 |
| JP | 2007-279858 A | 10/2007 |
| JP | 2008-293514 A | 12/2008 |
| JP | 2009-104314 A | 5/2009 |
| JP | 2009-104339 A | 5/2009 |
| JP | 2009-211566 A | 9/2009 |

OTHER PUBLICATIONS

Office Action (Notice of Grounds of Rejection) issued on Aug. 19, 2014, by the Japan Patent Office in corresponding Japanese Patent Application No. 2013-198458, and an English Translation of the Office Action. (8 pages).

Japanese Final Office Action issued Feb. 17, 2015 in corresponding Japanese Patent Application No. 2013-198458, with full English translation (15 pages).

F. Mizoguchi, "Immune System Network Security Using Biological Characteristics of Human," The Nikkan Kogyo Shimbun, Ltd., Toshitake Chino, Dec. 30, 2004, First Edition, pp. 130-131, Partial English-language translation is included.

Decision to Grant Patent issued on Aug. 27, 2013 by the Japanese Patent Office in corresponding Japanese Patent Application No. 2009-142282, and English-language translation thereof.

* cited by examiner

FIG.5

| CONNECTED DEVICE ID | MODEL NUMBER | MANUFACTURER | PRODUCT SERIAL NUMBER | PRESENCE/ABSENCE OF HARDWARE KEYBOARD | MONOCHROME/COLOR | GRAY SCALE | DISPLAY | IP ADDRESS |
|---|---|---|---|---|---|---|---|---|
| 000001 | MI-E1 (OPERATION PANEL) | S CORPORATION | A1234567 | ABSENT | COLOR | 16 | SMALL | ... |
| 000002 | SH-04 (PC) | S CORPORATION | S9876543 | PRESENT | COLOR | 256 | LARGE | ... |
| 000003 | KX-FE830 (MOBILE PHONE) | M CORPORATION | M456789 | ABSENT | COLOR | 256 | SMALL | ... |
| 000004 | MI-F1 (PC) | S CORPORATION | F147258 | PRESENT | COLOR | 256 | LARGE | ... |
| ... | ... | ... | ... | ... | ... | ... | ... | ... |

FIG. 10

| No. | USER NAME | PASSWORD | AUTHENTICATION IMAGE | BOX INFORMATION |
|---|---|---|---|---|
| 1 | Alice | Qwe890 | COLOR — 525 | ID 000001 |
| 2 | Bob | 3k9thg78 | COLOR — 526 | ID 000300 |
| 3 | Charlie | Kdiu5673 | MONOCHROME — 527 | ID 999000 |
| 4 | David | Kfi58sn2 | MONOCHROME — 528 | ID 123456 |
| 5 | Erik | 56n390i | MONOCHROME — 529 | ID 888888 |

FIG.24

| No. | OPERATION PANEL INFORMATION | COPY SOURCE MFP | COPY DESTINATION MFP | INVALIDATION STANDARD FOR REGISTERED AUTHENTICATION IMAGE DATA |
|---|---|---|---|---|
| 1 | COLOR /MONOCHROME | COLOR | MONOCHROME | INVALIDATE COLORED AUTHENTICATION IMAGE DATA |
| 2 | PANEL GRAY SCALE | 256 LEVELS | 128 LEVELS | INVALIDATE AUTHENTICATION IMAGE DATA THAT IS DIFFICULT TO DISCRIMINATE SUCH AS NATURAL IMAGE |
| 3 | PRESENCE/ABSENCE OF KEYBOARD | TEN-KEY SOFTWARE KEYBOARD | TEN-KEY SOFTWARE KEYBOARD | ... |
| 4 | PANEL SIZE | 800 × 480 DOTS | 640 × 240 DOTS | ... |
| 5 | ... | ... | ... | ... |

FIG.25

| No. | USER NAME | PASSWORD | AUTHENTICATION IMAGE | BOX INFORMATION |
|---|---|---|---|---|
| 1 | Alice | Qwe890 | INVALIDATED COLOR | ID 000001 |
| 2 | Bob | 3k9thg78 | INVALIDATED COLOR | ID 000300 |
| 3 | Charlie | Kdiu5673 | INVALIDATED MONOCHROME | ID 999000 |
| 4 | David | Kfi58sn2 | MONOCHROME | ID 123456 |
| 5 | Erik | 56n3901 | MONOCHROME | ID 888888 |

FIG.26
| No. | USER NAME | PASSWORD | AUTHENTICATION IMAGE | BOX INFORMATION |
|---|---|---|---|---|
| 1 | Alice | Qwe890 | (NO IMAGE) | ID 000001 |
| 2 | Bob | 3k9thg78 | (NO IMAGE) | ID 000300 |
| 3 | Charlie | Kdiu5673 | (NO IMAGE) | ID 999000 |
| 4 | David | Kfi58sn2 |  MONOCHROME | ID 123456 |
| 5 | Erik | 56n390l |  MONOCHROME | ID 888888 |

FIG.27
| A/a | A |  | 1 | 1  | @ | @  |
|---|---|---|---|---|---|---|
| B/b | B |  | 2 | ... | – | ... |
| C/c | C |  | 3 | ... | + | ... |
| D/d | D |  | 4 | ... | — | ... |
| E/e | ... | | 5 | ... | & | ... |
| ... | ... | | ... | ... | ... | ... |
FIG.28
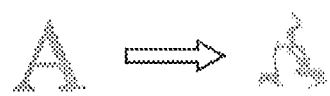
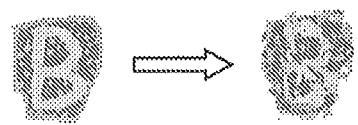

(RED)

INFORMATION PROCESSING APPARATUS CAPABLE OF AUTHENTICATION PROCESSING WITH IMPROVED USER CONVENIENCE, CONTROL PROGRAM FOR INFORMATION PROCESSING APPARATUS, AND RECORDING MEDIUM HAVING CONTROL PROGRAM FOR INFORMATION PROCESSING APPARATUS RECORDED THEREON

This application is based on Japanese Patent Application No, 2009-142282 filed with the Japan Patent Office on Jun. 15, 2009, the entire content of which is hereby incorporated by reference.

BACKGROUND OF THE INVENTION

Field of the Invention

The present invention relates to an information processing apparatus for executing an authentication process, a control method for the information processing apparatus, and a recording medium having a control program for the information processing apparatus.

Description of the Related Art

Conventionally, MFP (Multi Function Peripheral) has a box function. The box function allows for storage of copy document data, facsimile sent/received document data, and printed or scanned data for each user in a box (HDD (hard disk drive)) of the MFP body. When using the box function, each user stores his/her data in a prescribed region of HDD by setting an ID of the user and a corresponding password, thereby restricting access by others.

On the other hand, when the user accesses his/her own predetermined region of HDD, the user is requested to enter the password. However, MFP is not provided with a hardware keyboard and therefore, inconveniently, the user may be requested to enter the password with a software keyboard.

In order to address such a problem, Japanese Laid-Open Patent Publication No. 11-175726 proposes that the physical characteristic data (finger prints) of users is registered as authentication data and the registered authentication data is used to execute user authentication.

Furthermore, as disclosed in Japanese Laid-Open Patent Publication No. 2001-305968, an IC card may be used. Specifically, a method of performing a printing process is proposed in which authentication information is registered in an IC card, and personal authentication is performed by reading the authentication information registered in the IC card.

However, in order to realize those methods, a printer or MFP needs to be provided with a function of reading the characteristic data (finger prints) as authentication data or a function of reading an IC card, so that the costs are inevitably increased.

SUMMARY OF THE INVENTION

The present invention is made to solve the aforementioned problem. An object of the present invention is to provide an information processing apparatus, a control method for the information processing apparatus, and a control program for the information processing apparatus for improving the user's convenience in a simple way.

An information processing apparatus in accordance with an aspect of the present invention includes a controller for executing an authentication process in response to access from each of different kinds of operation devices each accepting an operation from a user. The operation device has a display for displaying information. The controller is configured to determine an order of priority of a plurality of authentication methods having respective different authentication manners, depending on the kind of the operation device that makes access, and display an authentication screen on the display of the operation device according to the authentication method in accordance with the determined order of priority.

Preferably, the controller determines whether the operation device that makes access has a hardware keyboard or not, and, based on the determination, determines an order of priority of the plurality of authentication methods.

Preferably, the controller determines whether the operation device that makes access is an operation device connected via a local area network or not, and, based on the determination, determines an order of priority of the plurality of authentication methods.

Preferably, the information processing apparatus further includes a printer for forming an image in accordance with an instruction from the controller, and a scanner for scanning an image in accordance with an instruction from the controller.

Preferably, the information processing apparatus further includes a memory in which personal data of a user is stored. The controller executes an authentication process at a time of access to the memory.

Preferably, the operation device is any of an operation panel, a personal computer, and a portable information device.

Preferably, the controller accepts user data of a user operating from the operation device and at least one input of authentication password data and image data.

Preferably, the plurality of authentication methods includes a password authentication method and an image authentication method.

In particular, when it is determined that an authentication process by the image authentication method is failed, the controller executes an authentication process by the password authentication method.

In particular, when it is determined that an authentication process by the password authentication method is successful, the controller displays on the display of the operation device an authentication image that would be a correct answer when an authentication process is executed next time by the image authentication method.

In particular, a valid period during which the authentication image is available is set.

In particular, when it is determined that an authentication process by the password authentication method is successful, the controller displays on the display of the operation device an authentication image that would be a correct answer when an authentication process is executed next time by the image authentication method in accordance with an attribute of the operation device.

In particular, the controller generates an authentication image that would be a correct answer when an authentication process is executed by the image authentication method in accordance with attribute information of the operation device.

In particular, the attribute information is information of a display size in the display of the operation device.

In particular, the attribute information is information of colored display or monochrome display in the display of the operation device.

In particular, the attribute information is information concerning gray scale of the display of the operation device.

In particular, the information processing apparatus further includes a memory for storing an authentication image according to the image authentication method. The controller determines an order of priority of the plurality of authentication methods, based on attribute information of the operation device that makes access and attribute information of an authentication image stored in the memory.

Preferably, the information processing apparatus is connected to another information processing apparatus capable of executing an authentication process, when access is made from one of the plurality of operation devices. The information processing apparatus further includes a memory for storing a plurality of authentication information respectively corresponding to the different kinds of operation devices. The controller verifies characteristics of another information processing apparatus that is connected, edits the plurality of authentication information stored in the memory in accordance with the characteristics of another information processing apparatus, based on a result of the verification, and sends to another information processing apparatus the plurality of edited authentication information stored in the memory for use in an authentication process in another information processing apparatus.

A control method for an information processing apparatus in accordance with an aspect of the present invention includes the steps of: accepting input of access from each of different kinds of operation devices each accepting an operation from a user; and executing an authentication process in response to the input of access. The operation device is provided with a display for displaying information. The step of executing an authentication process includes the steps of: determining an order of priority of a plurality of authentication methods having respective different authentication manners, depending on the kind of the operation device that makes access; and displaying an authentication screen on the display of the operation device according to the authentication method in accordance with the determined order of priority.

A recording medium having a control program recorded thereon to be executed in a computer of an information processing apparatus in accordance with an aspect of the present invention allows the computer to execute processing including the steps of: accepting input of access from each of different kinds of operation devices each accepting an operation from a user; and executing an authentication process in response to the input of access. The operation device is provided with a display for displaying information. The step of executing an authentication process includes the steps of: determining an order of priority of a plurality of authentication methods having respective different authentication manners, depending on the kind of the operation device that makes access; and displaying an authentication screen on the display of the operation device according to the authentication method in accordance with the determined order of priority.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a device information registration table of a device information obtaining unit 117.

FIG. 10 is a diagram showing exemplary data registered in an authentication data storage unit 114.

FIG. 24 shows a performance difference verification table.

FIG. 25 is a diagram illustrating an example in which authentication data registered in authentication data storage unit 114 is invalidated.

FIG. 26 is a diagram showing new authentication data saved in authentication data storage unit 114 of MFP 11a.

FIG. 27 shows a table for designing and converting a password (characters) into an image.

FIG. 28 shows that the designed image is subjected to image processing.

DESCRIPTION OF THE PREFERRED EMBODIMENTS

Figure 1:
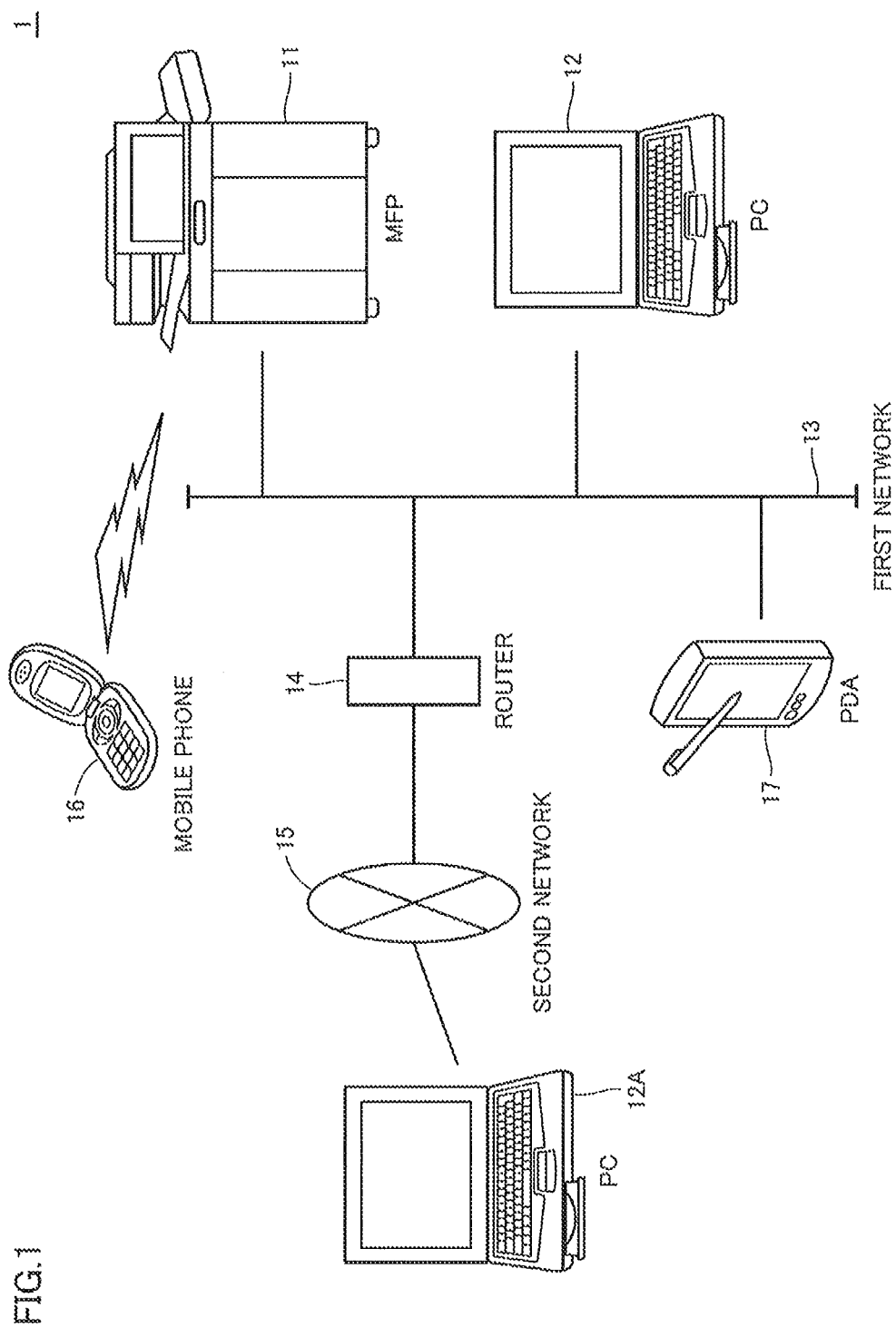
FIG. 1 is a diagram showing an information processing system 1 in accordance with a first embodiment of the present invention.

In the following, embodiments of the present invention will be described in detail with reference to the figures. It is noted that in the figures the same or corresponding parts are denoted with the same reference numerals and a description thereof will not be repeated.

First Embodiment

An information processing system 1 in accordance with a first embodiment of the present invention will be described using FIG. 1.

Referring to FIG. 1, here, a personal computer (also simply referred to as PC hereinafter) 12 as a terminal device and an MFP 11 are connected with each other through a LAN (Local Area Network) 13 which is a first network, A PDS (Personal Digital Assistant) 17 is also connected with MFP 11 through LAN 13.

PC 12 or PDA and MFP 11 are connected such that they can communicate data with each other through LAN 13.

A mobile phone 16 is also connected with MFP 11 to communicate data via radio communication.

LAN 13 is connected with a router 14, and router 14 is connected with a WAN 15 which is a second network. WAN 15 is connected with a PC 12A, so that PC 12A can communicate data with MFP 11 through WAN 15 or the like and router 14.

In the first embodiment, a process of accessing a box function of MFP 11 from a device connected with MFP 11 via LAN or WAN will be described.

Although a configuration in which one PC serving as a terminal device is connected with LAN 13 or WAN 15 is described here, the number of devices is not limited to one and more than one device may be connected. In other words, any configuration may be employed as long as MFP 11 can be accessed from the plurality of devices (operating devices).

At least one device is connected. Not only LAN but also WAN (Wide Area Network) or the like may be employed.

Using FIG. 2, a schematic block diagram of MFP 11 and PC 12 capable of communicating with MFP 11 in accordance with the first embodiment of the present invention will be described.

Figure 2:
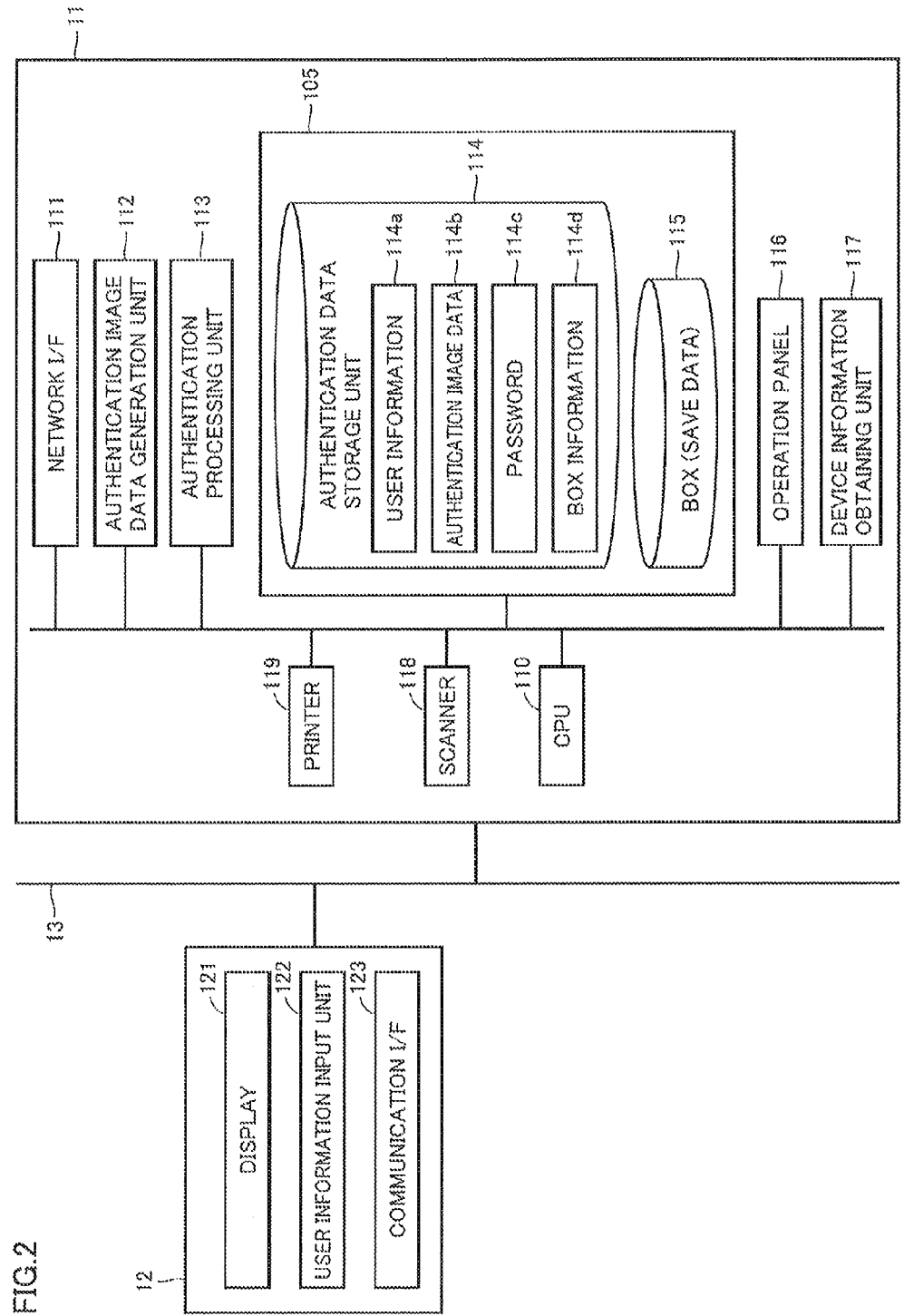
FIG. 2 is a schematic bock diagram showing an MFP 11 and a PC 12 capable of communicating with MFP 11 in accordance with the first embodiment of the present invention.

Referring to FIG. 2, MFP 11 in accordance with the first embodiment of the present invention includes a CPU 110, a network I/F 111, an authentication image data generation unit 112, an authentication processing unit 113, an HDD 105, an operation panel 116, a device information obtaining unit 117, a scanner 118, and a printer 119. Those units are connected through an internal bus so that they can communicate data with each other.

CPU 110 controls the entire MFP 11 and outputs a predetermined instruction to each unit.

Network I/F unit 111 is an interface that executes data communication with an external device through LAN 13 or the like.

Authentication image data generation unit 112 is a unit for generating image data for authentication as described later.

Authentication processing unit 113 is a unit for executing an authentication process as described later.

HDD 105 is a storage region for storing a variety of data.

Operation panel 116 is an input interface of MFP 11 and accepts the user's operation input to accept input of an instruction, for example, for setting a variety of jobs. A display is also provided to present predetermined information to the user.

Device information obtaining unit 117 is a unit for obtaining information of a device connected with MFP 11.

Scanner 118 scans a document set on a not-shown platen to obtain image data.

Printer 119 prints image data on prescribed paper.

MFP 11 is connected with PC 12 serving as a terminal device through LAN 13.

PC 12 includes a display 121, a user information input unit 122, and a communication I/F 123.

For example, user information input unit 122 is an input interface such as a mouse or a keyboard. The user inputs data using the mouse or keyboard as user information input unit 122, in accordance with a predetermined content (login screen or the like) appearing on display 121, and the input data is, for example, sent to MFP 11 through communication I/F 123. Alternatively, information sent from MFP 11 is received by communication I/F 123 and then displayed on display 121 in accordance with the received content.

Although the description has been made to PC 12, other devices, that is, PDA 17, mobile phone 16 and another PC also have the similar function.

In this embodiment, a description will be made to a case where the box function is used by accessing MFP 11 from a plurality of connected devices.

Figure 3:
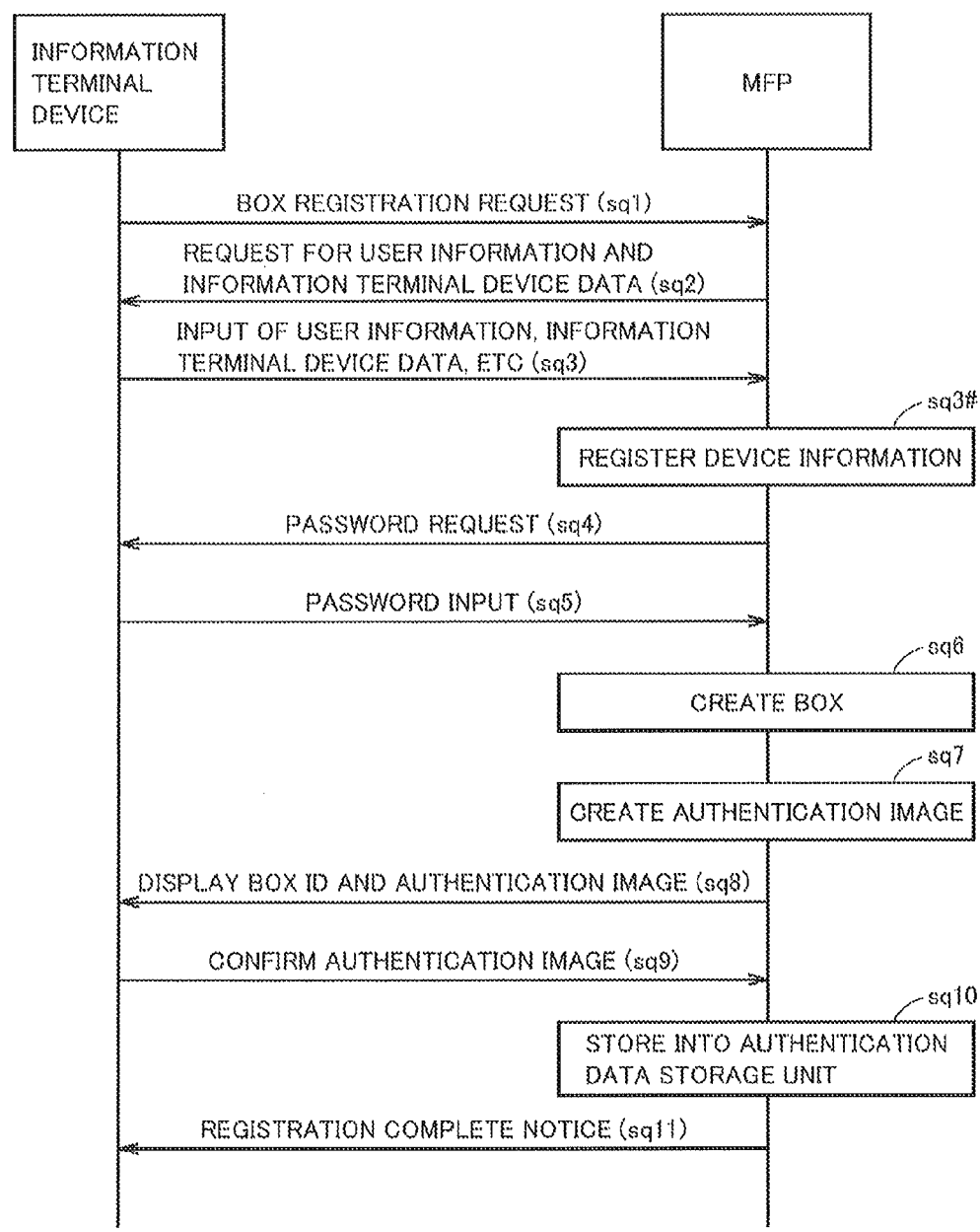
FIG. 3 is a diagram illustrating a process flow between an information terminal device and MFP in accordance with the first embodiment of the present invention.

Using FIG. 3, a process flow between an information terminal device and MFP in accordance with the first embodiment of the present invention will be described. PC 12 will be described as an example of the information terminal device.

Here, a process of registering a user who uses the box function of MFP 11 will be described.

First, CPU 110 of MFP 11 receives input of a box registration request command (sequence sq1). CPU 110 of MFP 11 then requests user information from PC 12 in response to the box registration request command from PC 12. Furthermore, device information obtaining unit 117 of MFP 11 requests data of the information terminal device connected with MFP 11, etc. (sequence sq2).

Using FIG. 4, a user account generation screen will be described.

Figure 4:
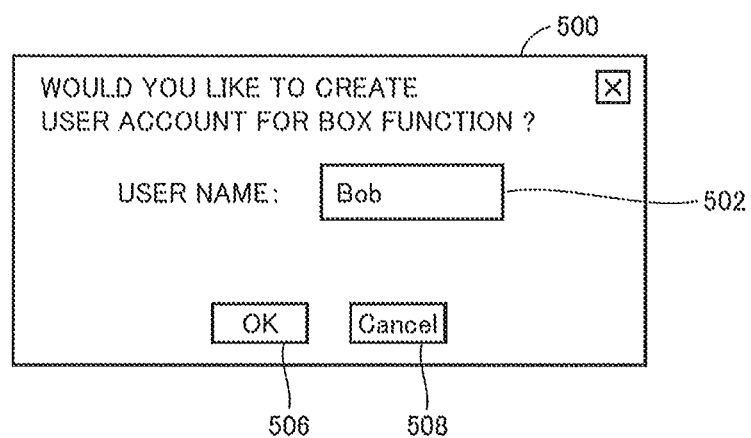
FIG. 4 shows a user account generation screen.

Referring to FIG. 4, here, a user account generation screen 500 is shown. On this screen, the user can enter and register his/her user ID. Specifically, on user account generation screen 500, "Do you want to create a user account for the box function?" appears together with an entry field 502. In this example, "Bob" is input in entry field 502.

Then, in the lower region of the screen, an "OK" button 506 and a "Cancel" button 508 are provided. The user specifies "OK" button 506 whereby the user ID data input in entry field 502 is output as user information to MFP 11.

Furthermore, in response to the request from device information obtaining unit 117, data of the information terminal device and the like is output from PC 12 together with the user information. For example, data such as the model number, the manufacturer name, the product serial number, the presence/absence of a hardware keyboard, monochrome/color, gray scale, display, etc. is output.

On the other hand, user account generation screen 500 is cleared by specifying "Cancel" button 508, and the box request command is cancelled.

Referring to FIG. 3 again, MFP 11 receives input of the user information and the information terminal device data from PC 12 (sequence sq3), and then MFP 11 executes a device information registration process (sequence sq3#).

Using FIG. 5, a device information registration table of device information obtaining unit 117 will be described.

Device information obtaining unit 117 stores the information terminal device data that is the obtained device information, etc. in the device information registration table. The connected device IDs are allocated in the order of storage.

Referring to FIG. 5, here, in the device information registration table, IDs are allocated as connected device IDs in order from "000001." Then, it is shown that device information is registered, including "model number," "manufacturer name," "product serial number," "presence/absence of hardware keyboard," "monochrome/color," "gray scale," "display," "IP address," etc.

For example, for the connected device ID "000001," registered are the model number of an operation panel "MI-E1," the manufacturer name "S Corporation," the product serial number "A1234567," the presence/absence of hardware keyboard "absent" monochrome/color "color," gray scale "16 levels," display "small," the IP address, and the like.

For the connected device ID "000002," registered are the model number of PC "SH-04," the manufacturer name "S Corporation," the product serial number "S9876543," the presence/absence of hardware keyboard "present," monochrome/color "color," gray scale "256 levels," display "large," the IP address, and the like.

For the connected device ID "000003," registered are the model number of a mobile phone "KX-FE830," the manufacturer name "M Corporation," the product serial number "M456789," the presence/absence of hardware keyboard "absent," monochrome/color "color," gray scale "256 levels," display "small," the IP address, and the like.

For the connected device ID "000004," registered are the model number of a PC "M1-F1," the manufacturer name "S Corporation," the product serial number "F147258," the presence/absence of hardware keyboard "present," monochrome/color "color," gray scale "256 levels," display "large," the IP address, and the like.

Referring to FIG. 3 again, CPU 110 then requests a password from PC 12 (sq4).

Using FIG. 6, a password request screen will be described.

Figure 6:
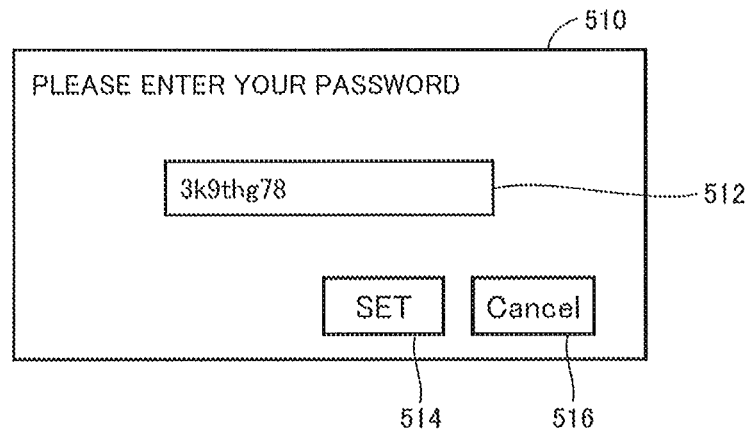
FIG. 6 shows a password request screen.

Referring to FIG. 6, here, a password request screen 510 is shown. On this screen, the password entered by the user and the user ID are registered in association with each other.

Specifically, on password request screen 510, "Please enter your password" appears together with an entry field 512. In this example, "3k9thg78" is input in entry field 512.

In the lower region of the screen, a "Set" button 514 and a "Cancel" button 516 are provided. The user specifies "Set" button 514 whereby data input in entry field 512 is output as password data to MFP 11.

On the other hand, password request screen 510 is cleared by specifying "Cancel" button 516, and the box request command is cancelled.

Referring to FIG. 3 again, MFP 11 then accepts input of the password from PC 12 (sequence sq5) to create a box (sequence sq6). Specifically, box information (box ID) of HDD 105 is created corresponding to the user information. In this example, "ID000300" is created as box information.

Then, an authentication image is generated (sequence sq7). Specifically, an authentication image is generated by authentication image data generation unit 112. An authentication image generation process in authentication image data generation unit 112 will be described later.

Then, the generated authentication image is output to PC 12 (sequence sq8).

Using FIG. 7, an authentication image confirmation screen 520 in accordance with the first embodiment of the present invention will be described.

Figure 7:
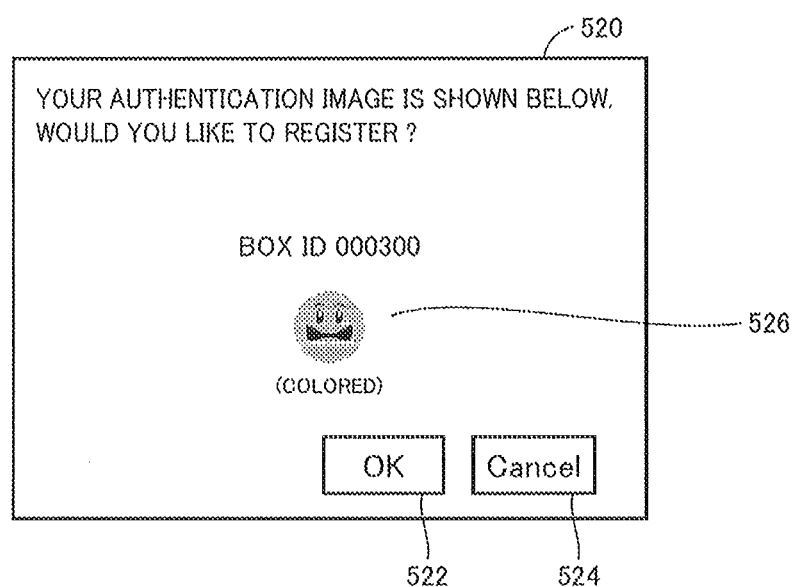
FIG. 7 shows au authentication image confirmation screen 520 in accordance with the first embodiment of the present invention.

Referring to FIG. 7, here, an authentication image confirmation screen 520 is shown. On this screen, "Your authentication image is shown below. Would you like to register?" appears. In addition, "ID000300" as the box information and a colored object image 526 as the authentication image generated by authentication image data generation unit 112 are displayed.

Then, in the lower region of the screen, an "OK" button 522 and a "Cancel" button 524 are provided. The user specifies "OK" button 522 whereby data is output to MFP 11 to indicate that the displayed object image 526 is confirmed as an authentication image.

Referring to FIG. 3 again, MFP 11 receives a notice of PC authentication image confirmation (sequence sq9) and then stores the data in the authentication data storage unit (sequence sq10). Specifically, CPU 110 registers the user ID "Bob" in a user information region 114a of authentication data storage unit 114 of HDD 105. Furthermore, object image 526 is registered in an authentication image data region 114b. Password "3k9thg78" is registered in a password region 114c. "ID000300" is registered in a box information region 114d.

Then, a registration complete notice is output to PC 12 (sequence sq11).

Using FIG. 8, a registration complete notice confirmation screen 530 will be described.

Figure 8:
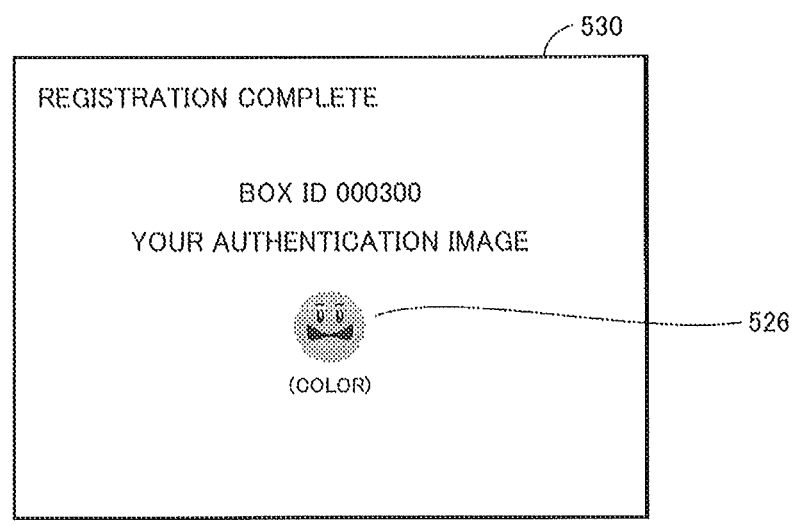
FIG. 8 shows a registration complete notice confirmation screen 530.

Referring to FIG. 8, registration complete notice confirmation screen 530 is shown here. On this screen "Registration Complete" appears. In addition, "ID 000300" as box information and object image 526 as "your authentication image" are displayed again.

Here, the colored object image 526 generated by authentication image data generation unit 112 is displayed as an authentication image.

Using FIG. 9, an authentication image generation process in authentication image data generation unit 112 in accordance with the first embodiment of the present invention will be described.

Figure 9:
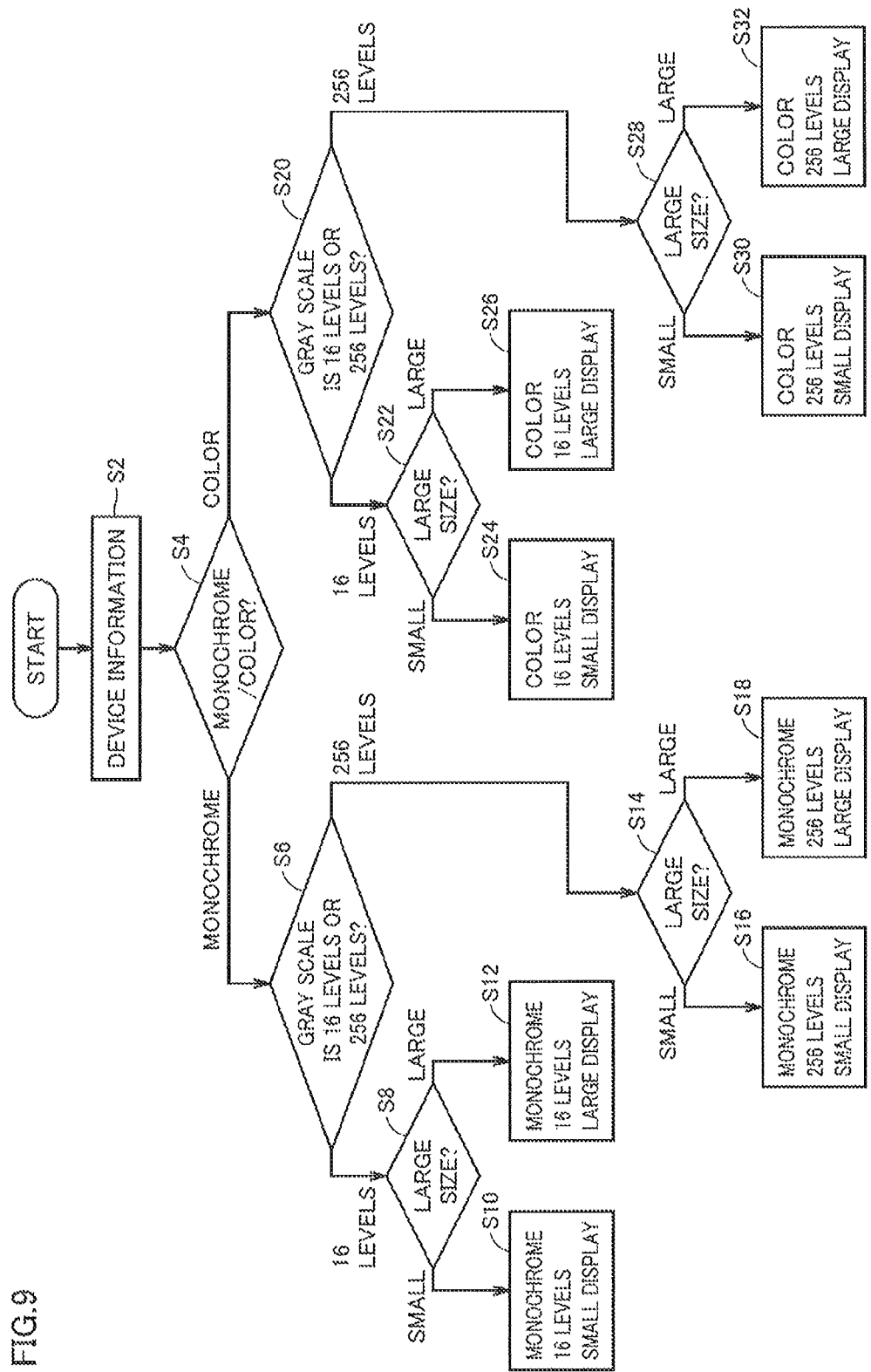
FIG. 9 is a flowchart illustrating an authentication image generation process in an authentication image data generation unit 112 in accordance with the first embodiment of the present invention.

Referring to FIG. 9, device information is first obtained (step S2). Specifically, the device information stored in the device information registration table held by device information obtaining unit 117 is obtained. In particular, in this device information, data indicating color or monochrome, data of gray scale, and data of a screen display size are obtained, which are information concerning the display format of the display of the information terminal device.

Then, it is determined whether the display format of the display is monochrome or color (step S4).

If the display format of the display is monochrome in step S4, then process proceeds to step S6.

On the other hand, if the display format of the display is color, then the process proceeds to step S20.

Then, if it is determined as being monochrome in step S4, then it is determined whether the gray scale of the display is 16 levels or 256 levels (step S6).

If the gray scale of the display is 16 levels in step S6, then the process proceeds to step S8.

Then, it is determined whether the display size of the display is large or small (step S8). Specifically, it is determined whether the display size is equal to or greater than 640×480 dots, by way of example.

If the display size of the display is small (if less than 640×480 dots) in step S8, it is determined that the characteristics of the display are monochrome, 16 levels, small display size (step S10). Then, an authentication image is generated in accordance with those characteristics. On the other hand, if the display size of the display is large (if equal to or more than 640×480 dots) in step S8, it is determined that the characteristics of the display are monochrome, 16 levels, and large display size (step S12). Then, an authentication image is generated in accordance with those characteristics.

Similarly, if it is determined that the gray scale of the display is 256 levels in step S6, then it is determined whether the display size of the display is large or small (step S14).

If the display size of the display is small (if less than 640×480 dots) in step S14, it is determined that the characteristics of the display are monochrome, 256 levels, small display size (step S16). Then, an authentication image is generated in accordance with those characteristics. On the other hand, if the display size of the display is large in step S14, it is determined that the characteristics of the display are monochrome, 256 levels, and large display size (step S18). Then, an authentication image is generated in accordance with those characteristics.

If it is determined as being color in step S4, then it is determined whether the gray scale of the display is 16 levels or 256 levels (step S20).

If the gray scale of the display is 16 levels in step S20, then the process proceeds to step S22.

Then, it is determined whether the display size of the display is large or small (step S22).

If the display size of the display is small (if less than 640×480 dots) in step S22, it is determined that the characteristics of the display are color, 16 levels, small display size (step S24). Then, an authentication image is generated in accordance with those characteristics. On the other hand, if the display size of the display is large in step S22, it is determined that the characteristics of the display are color, 16 levels, and large display size (step S26). Then, an authentication image is generated in accordance with those characteristics.

Similarly, if it is determined that the gray scale of the display is 256 levels in step S20, then it is determined whether the display size of the display is large or small (step S28).

If the display size of the display is small in step S28, it is determined that the characteristics of the display are color, 256 level, and small display size (step S30). Then, an authentication image is generated in accordance with those characteristics. On the other hand, if the display size of the display is large in step S28, it is determined that the characteristics of the display are color, 256 levels, and large display size (step S32). Then, an authentication image is generated in accordance with those characteristics.

Execution of this processing allows an authentication image to be generated in accordance with the display format of the information device.

Using FIG. 10, an example of data registered in authentication data storage unit 114 will be described.

Referring to FIG. 10, shown here are five data stored in authentication data storage unit 114. Specifically, a password "Qwe890" corresponding to a user ID "Alice," a colored object image 525 as an authentication image, and "ID000001" as box information are shown. Similarly, a password "3k9thg78" corresponding to a user ID "Bob," a colored object image 526 as an authentication image, and "ID000300" as box information are shown. A password "Kdiu5673" corresponding to a user ID "Charlie," a monochrome object image 527 as an authentication image, and "ID999000" as box information are shown. A password "Kfi58sn2" corresponding to a user ID "David," a monochrome object image 528 as an authentication image, and "ID123456" as box information are shown. A password "56n3901" corresponding to a user ID "Erik," a monochrome object image 529 as an authentication image, and "ID888888" as box information are shown.

It is noted that a valid period during which an authentication image is available may be set, and the authentication image may be invalidated after the certain period of time. Specifically, the authentication image may be deleted.

Although not shown here, for example, data such as the color, gray scale, and size of an object image is also stored as attribute information of the authentication image, together with the object image.

Using FIG. 11, an authentication process in accordance with the first embodiment of the present invention in a case where registered data exists in authentication data storage unit 114 will be described.

Figure 11:
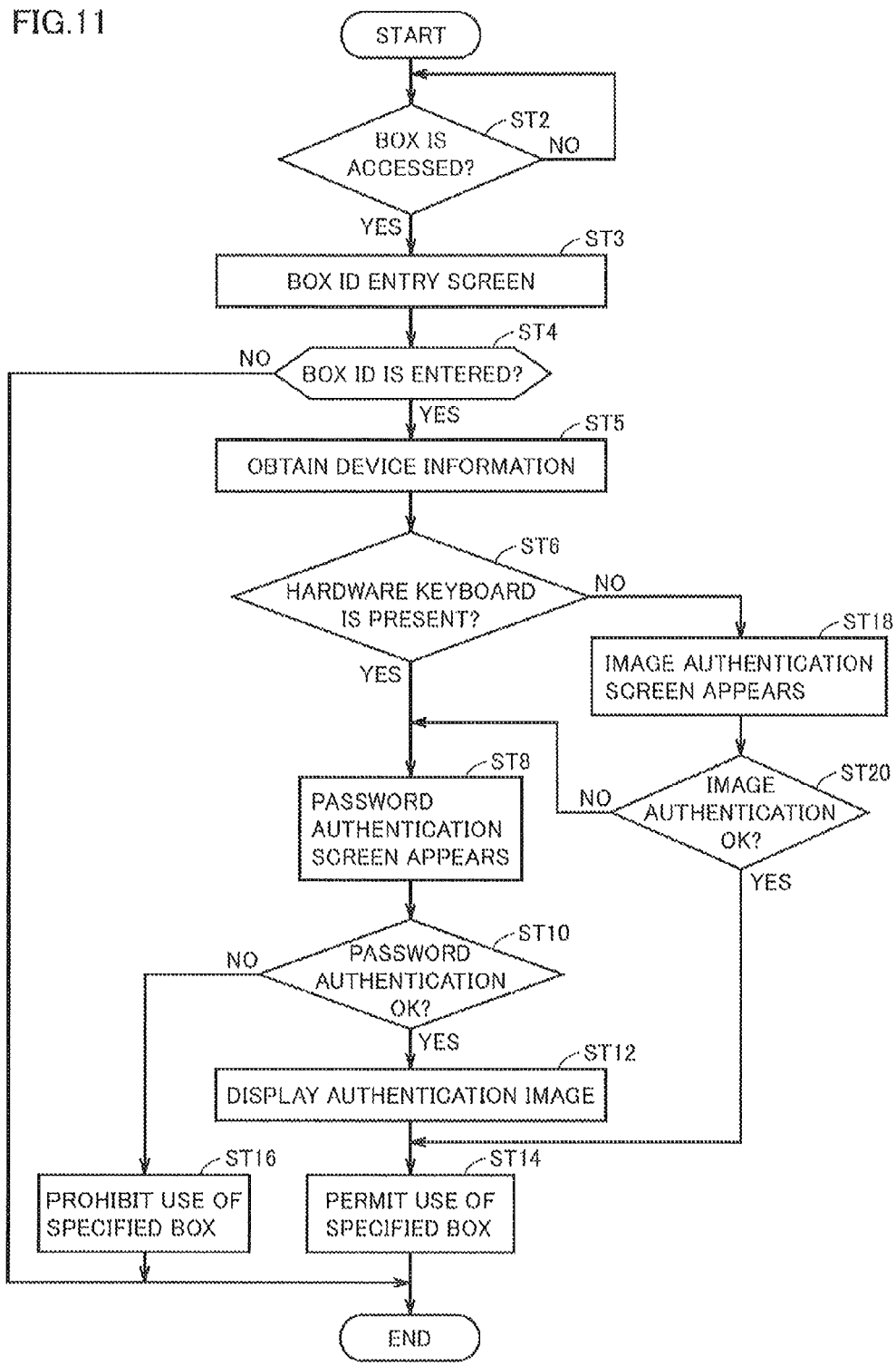
FIG. 11 is a flowchart illustrating an authentication process in accordance with the first embodiment of the present invention in a case where registered data exists in authentication data storage unit 114.

Referring to FIG. 11, first, it is determined whether a box is accessed or not (step ST2). Specifically, CPU 110 determines whether a box region 115 of HDD 105 is accessed from a device or not.

If it is determined that box region 115 is accessed in step ST2, then a box ID entry screen is displayed (step ST3).

Using FIG. 12, the box ID entry screen will be described.

In this example, the box is accessed from an operation panel, by way of example.

Figure 12:
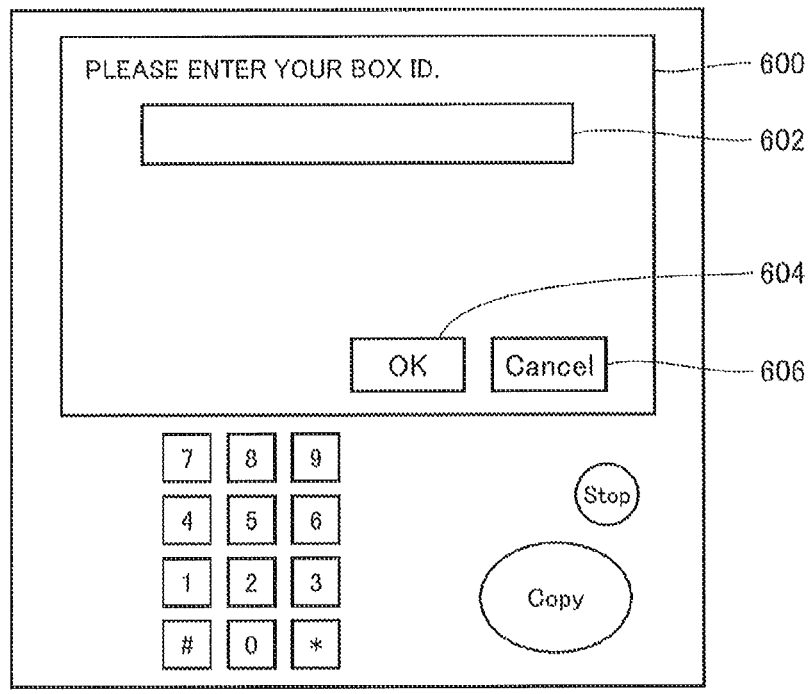
FIG. 12 shows a box ID entry screen.

Referring to FIG. 12, on a box ID entry screen 600, here, "Please enter your box ID" appears, and an entry field 602 for a box ID is provided. The user can enter the box ID corresponding to his/her own box region, which is made known to the user in advance, using numeric keys or the like, and then specify an "OK" button 604. When a "Cancel" button 606 is specified, the access to box region 115 is ended (END).

For example, here, box ID "000300" is specified.

Referring to FIG. 11 again, CPU 110 then determines whether a box ID is entered or not (step ST4).

If it is determined that a box ID is entered in step ST4, then CPU 110 obtains device information (step ST5). Specifically, CPU 110 gives an instruction to device information obtaining unit 117 so that device information obtaining unit 117 executes data communication with the information device that has made access. In this example, device information obtaining unit 117 executes data communication with the operation panel, and it is determined that access has been made by the operation panel of the connected device ID "000001" stored in the device information registration table, by way of example.

On the other hand, if it is determined that no box ID is entered in step ST4, CPU 110 ends the process (END).

After the device information is obtained in step ST5, CPU 110 then determines whether a hardware keyboard is present or not (step ST6). CPU 110 can make determination based on the information stored in the device information registration table, as described above.

If it is determined that a hardware keyboard is present in step ST6 (YES in step ST6), CPU 110 gives an instruction to authentication processing unit 113 so that authentication processing unit 113 displays a password authentication screen (step ST8).

On the other hand, if it is determined that no hardware keyboard is present in step ST6, CPU 110 gives an instruction to authentication processing unit 113 so that authentication processing unit 113 displays an image authentication screen (step ST18).

Using FIG. 13, the image authentication screen displayed by authentication processing unit 113 in accordance with the first embodiment of the present invention will be described.

In this example, it is assumed that the box is accessed from an operation panel without a hardware keyboard, by way of example.

Figure 13:
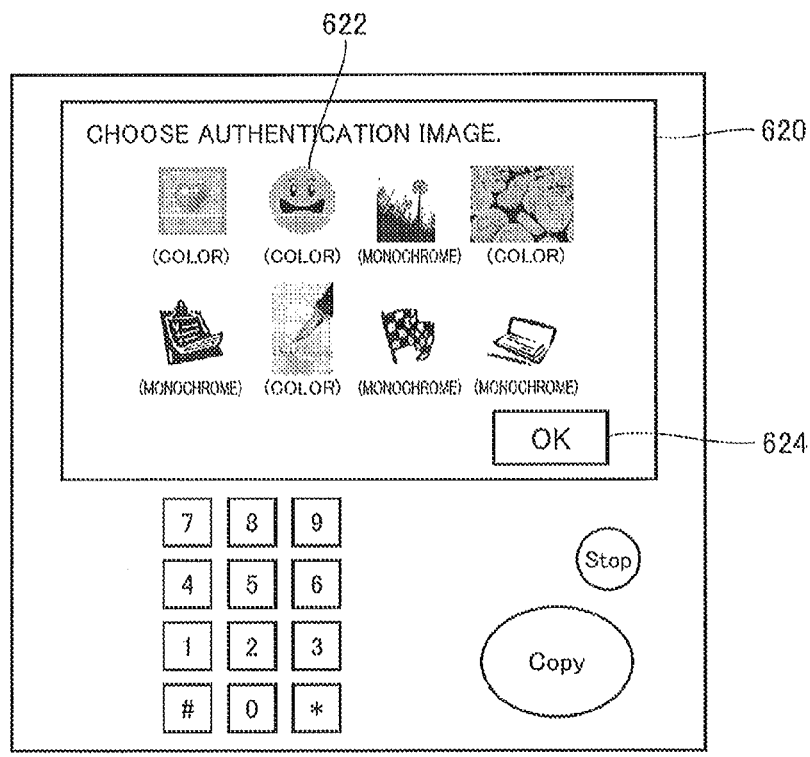
FIG. 13 shows an image authentication screen displayed by an authentication processing unit 113 in accordance with the first embodiment of the present invention.

Referring to FIG. 13, an image authentication screen 620 displayed by authentication processing unit 113 is shown.

Image authentication screen 620 includes the user's own authentication image among a plurality of object images, and the user can specify his/her own authentication image from among the plurality of object images and specify an "OK" button 624 to initiate an authentication process.

Specifically, authentication processing unit 113 places the authentication image stored corresponding to the specified box ID and other dummy images on image authentication screen 620. Here, for example, an object image 622 corresponding to the box ID 000300 and other dummy images are placed. Although eight object images are placed here, the number of images is not limited as long as more than one image is placed. The security can be enhanced by increasing the number.

It is noted that the placed dummy images are selected from the plurality of object images stored in HDD or the like in advance.

Referring to FIG. 11 again, if it is determined that the image authentication is successful by authentication processing unit 113 (YES in step ST20), then the process proceeds to step ST14, and the specified box is set available. More specifically, authentication processing unit 113 notifies CPU 110 that the authentication is successful, and CPU 110 then sets the box available and displays the contents of the box.

Therefore, according to the process in accordance with the first embodiment of the present invention, for example, when an information device (operation panel) without a hardware keyboard makes access, if data is registered in authentication data storage unit 114, image authentication can be executed. Thus, the authentication process can easily be executed even without a hardware keyboard, thereby offering convenience to the users.

On the other hand, if it is determined that the image authentication is failed by authentication processing unit 113 (NO in step ST20), the process proceeds to step ST8, and authentication processing unit 113 displays a password authentication screen.

Using FIG. 14, the password authentication screen will be described.

In this example, it is assumed that the box is accessed from an operation panel without a hardware keyboard, by way of example.

Figure 14:
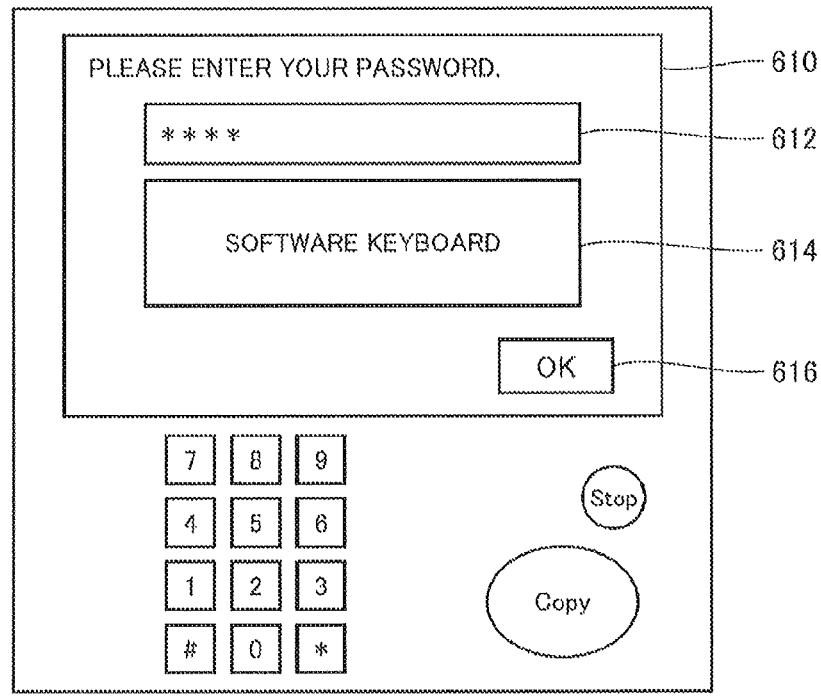
FIG. 14 shows a password authentication screen.

Referring to FIG. 14, provided on a password authentication screen 610 are an entry field 612 for entering a password, a software keyboard 614 used to enter a password, and an "OK" button.

On password authentication screen 610, the user makes an entry by specifying characters and the like displayed on software keyboard 614 for input in entry field 612 and specifies "OK" button 616 to initiate an authentication process.

Referring to FIG. 11 again, in step ST10, authentication processing unit 113 displays an authentication image, if the password authentication is successful (step ST12). Specifically, authentication processing unit 113 notifies CPU 110 that the authentication is successful, and then CPU 110 reads out and displays an object image for authentication which is stored in authentication image data region 114b of authentication data storage unit 114.

Then, the specified box is set available (step ST14). Then, the process ends (END). More specifically, authentication processing unit 113 notifies CPU 110 that the authentication is successful, and then CPU 110 sets the box available and displays the contents stored in the box.

On the other hand, if the password authentication is failed, the use of the specified box is prohibited (step ST16). Specifically, authentication processing unit 113 notifies CPU 110 that the authentication is failed, and CPU 110 sets the specified box unavailable. The process then ends (END).

Using FIG. 15, an authentication image confirmation screen 660 in accordance with the first embodiment of the present invention will be described.

In this example, it is assumed that the box is accessed from an operation panel without a hardware keyboard, by way of example.

Figure 15:
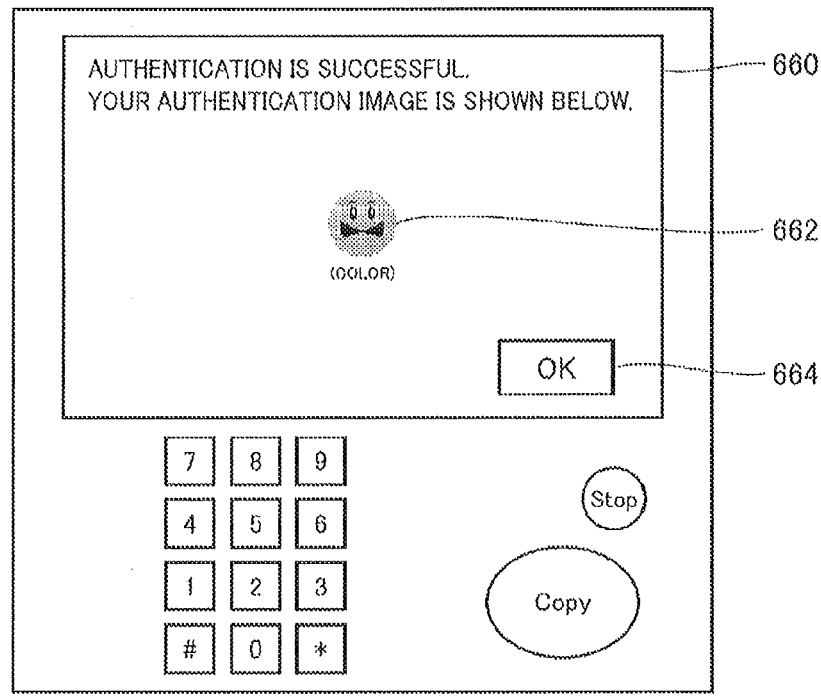
FIG. 15 shows an authentication image confirmation screen 660 in accordance with the first embodiment of the present invention.

Referring to FIG. 15, "Authentication is successful" appears on authentication image confirmation screen 660, and in addition, "Your authentication image is shown below" appears together with the registered object image 662, which is available when the box is accessed from the operation panel next time. Then, the screen is cleared by specifying an "OK" button 664.

In a case where image authentication is once failed in image authentication screen 620 and password authentication is successful, the authentication image is displayed again to allow the user to remember again the object image for image authentication that has previously been registered by the user and to access the box using the authentication image when making access from the operation panel next time, thereby offering convenience to the user.

In the foregoing description, a box is accessed from an operation panel without a hardware keyboard. A description will now be made to a case where a box is accessed from PC 12 having a hardware keyboard.

Using FIG. 16, a box ID entry screen in a PC will be described.

In this example, it is assumed that a box is accessed from PC 12 having a hardware keyboard, by way of example.

Figure 16:
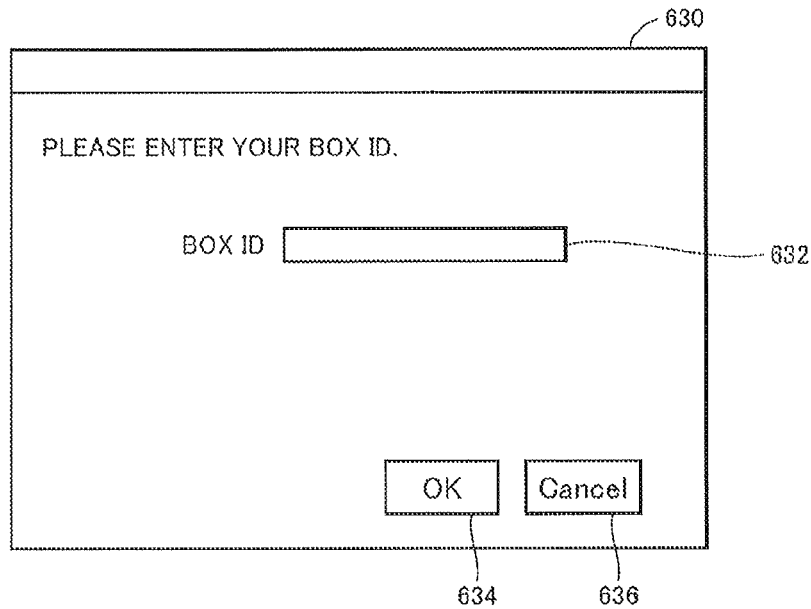
FIG. 16 shows a box ID entry screen in a PC.

Referring to FIG. 16, on a box ID entry screen 630, here, "Please enter your box ID" appears together with a box ID entry field 632. The user can enter a box ID in box ID entry field 632 using the hardware keyboard.

Then, an "OK" button 634 and a "Cancel" button 636 are provided in the lower region. When "OK" button 634 is specified, data input in entry field 632 is transmitted to MFP 11. For example, here, box ID "000300" is specified.

Accordingly, in step ST4 in FIG. 11, CPU 110 determines that a box ID is entered, and the process in the next step ST5 is executed.

On the other hand, when "Cancel" button 636 is specified, in step ST4 in FIG. 11, CPU 110 determines that no box ID is entered, and then the process ends.

Then, if it is determined that a box ID is entered in step ST4, CPU 110 obtains device information (step ST5). In this example, device information obtaining unit 117 executes data communication with PC 12, and it is determined that the access is made from the operation panel of the connected device ID "000002" stored in the device information registration table.

Then, if it is determined that a hardware keyboard is present in step ST6 (YES in step ST6), CPU 110 gives an instruction to authentication processing unit 113 so that authentication processing unit 113 displays a password authentication screen. In this example, data for displaying the password authentication screen is sent to PC 12. The password authentication screen is then displayed on the display of PC 12.

Using FIG. 17, the password authentication screen displayed by authentication processing unit 113 in accordance with the first embodiment of the present invention will be described.

In this example, it is assumed that a box is accessed from PC 12 having a hardware keyboard, by way of example.

Figure 17:
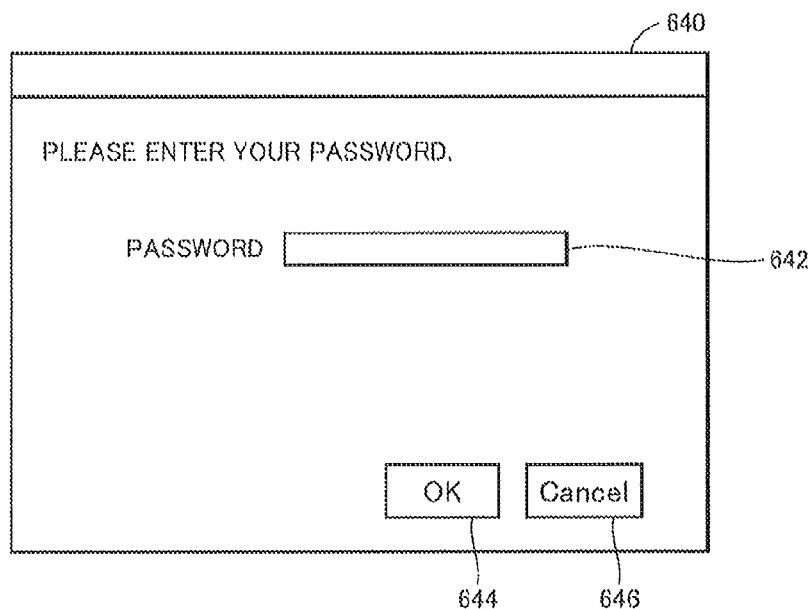
FIG. 17 shows a password authentication screen displayed by authentication processing unit 113 in accordance with the first embodiment of the present invention.

Referring to FIG. 17, a password authentication screen 640 displayed by authentication processing unit 113 is shown.

On password authentication screen 640, "Please enter your password" appears together with a password entry field 642. An authentication process can be initiated by entering the user's password in entry field 642 and specifying an "OK" button 644.

Then, if the authentication is successful in authentication processing unit 113, authentication processing unit 113 makes a notification to CPU 110, and CPU 110 reads out and displays an object image for authentication stored in authentication image data region 114*b* of authentication data storage unit 114.

Using FIG. 18, an authentication image confirmation screen 650 in accordance with the first embodiment of the present invention will be described.

In this example, it is assumed that a box is accessed from PC 12 having a hardware keyboard, by way of example.

Figure 18:
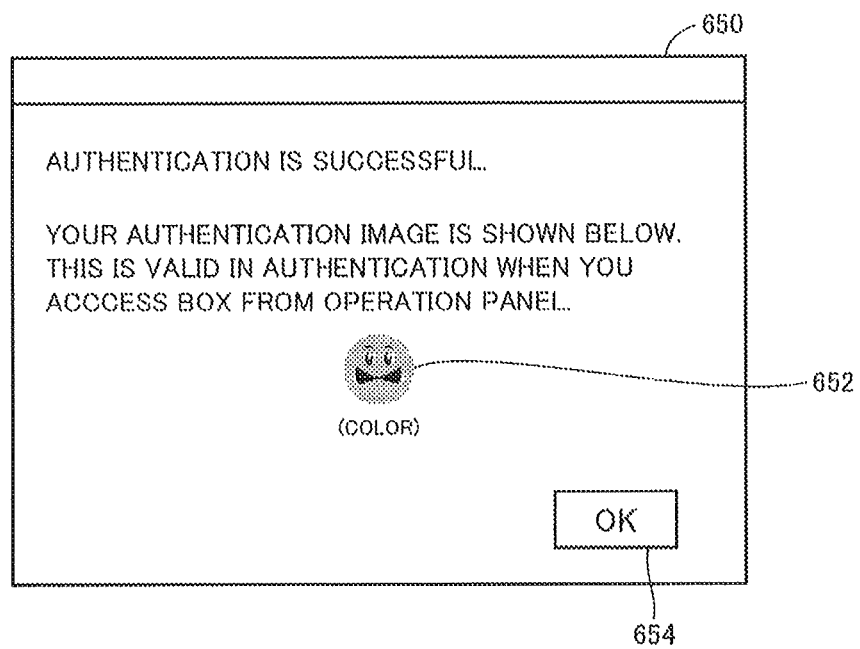
FIG. 18 shows an authentication image confirmation screen 650 in accordance with the first embodiment of the present invention.

Referring to FIG. 18, on authentication image confirmation screen 650, "Authentication is successful" appears, and displayed is "Your authentication image is shown below. This is valid in authentication when you access the box from an operation panel." A registered object image 652 is displayed which is available when the box is accessed from an operation panel next time. Then, the screen is cleared by specifying an "OK" button 654.

Display of the authentication image confirmation screen allows the user to remember again the object image for image authentication that has previously been registered and to access the box using this authentication image when making access from an operation panel next time, thereby offering convenience to the user.

As described above, in the technique in accordance with the first embodiment of the present invention, the priority of authentication methods can be switched depending on the kind of information devices that make access to a box.

Specifically, when a box is accessed from an information device without a keyboard, an authentication process can be executed with higher priority given to image authentication than password authentication.

On the other hand, when a box is accessed from an information device having a keyboard, an authentication process can be executed with higher priority given to password authentication than image authentication.

Therefore, the priority of authentication methods can be switched depending on the presence/absence of a keyboard, thereby offering convenience to the user.

In this embodiment, the description has been made to the configuration in which the authentication process is executed with the priority of the authentication process being switched, in a case of access to a box. However, the present invention is not limited to access to a box and is applicable similarly to a case where an authentication process is executed when any other function is performed.

Furthermore, this embodiment is also applicable similarly to portable information devices such as mobile phones and PDA.

First Modification of First Embodiment

In the foregoing description, an authentication process is executed with the priority of authentication methods being switched depending on the presence/absence of a keyboard. However, the determination can be made not only depending on the presence/absence of a keyboard but also based on any other condition.

Using FIG. 19, an authentication process in accordance with a first modification of the first embodiment of the present invention will be described.

Figure 19:
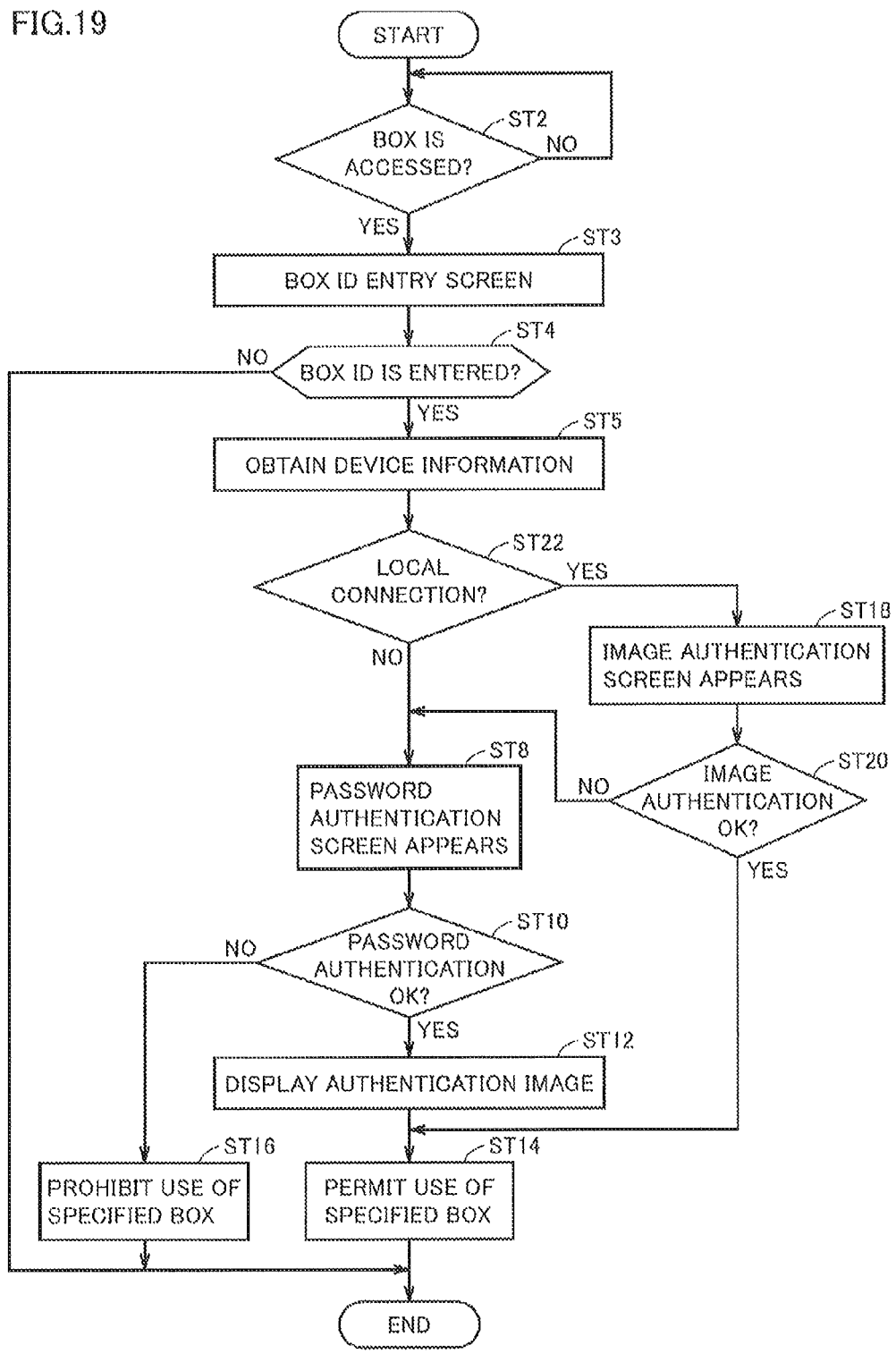
FIG. 19 is a flowchart illustrating an authentication process in accordance with a first modification of the first embodiment of the present invention.

Referring to FIG. 19, the flowchart differs from the flowchart in FIG. 11 in that the determination as to whether a hardware keyboard is present or not in step ST6 is changed to step ST22. The other points are similar and therefore a detailed description thereof will not be repeated.

In this modification, after device information is obtained in step ST5, it is determined whether local connection is established or not in step ST22.

Specifically, CPU 110 gives an instruction to device information obtaining unit 117 so that device information obtaining unit 117 executes data communication with the information device that has made access. In this example, it is assumed that device information obtaining unit 117 executes data communication with PC 12, and it is determined that access is made from the operation panel of the connected device ID "000002" stored in the device information registration table. At this time, the IP address of the information device is obtained.

Then, CPU 110 determines whether the information device is locally connected or not based on the obtained IP address. CPU 110 determines that the information device that is connected with WAN 15 external to router 14 is not locally connected, and determines that the information device that is connected with LAN 13 is locally connected.

Then, if it is determined that the information device that has made access is not locally connected (NO in step ST7), CPU 110 gives an instruction to authentication processing unit 113 so that authentication processing unit 113 displays a password authentication screen (step ST8).

On the other hand, if it is determined that the information device that has made access is locally connected (YES in step ST7), CPU 110 gives an instruction to authentication processing unit 113 so that authentication processing unit 113 displays an image authentication screen (step ST18). The subsequent processes are similar to those described in the foregoing first embodiment and therefore a detailed description thereof will not be repeated.

In this modification, in the case of local connection, an authentication process is executed with higher priority given to image authentication, whereas in the case of non-local connection, an authentication process is executed with higher priority given to password authentication. According to this technique, for an information device that is locally connected, the user's convenience is taken account of, whereas for an external information device that is not locally connected, password authentication is preferentially performed, taking security into account.

In this modification, the description has been made to the case where the priority of authentication methods is switched based on whether local connection is established or not. However, the determination may be made on a condition of whether the connection is via an in-house intranet or not.

Furthermore, the determination may be made in combination with the condition of the presence/absence of a keyboard.

Second Modification of First Embodiment

The technique in FIG. 11 is based on the presence/absence of a hardware keyboard, and image authentication is executed when no hardware keyboard is present. The determination may be made in combination with any other additional condition.

Using FIG. 20, an authentication process in accordance with a second modification of the first embodiment will be described.

Figure 20:
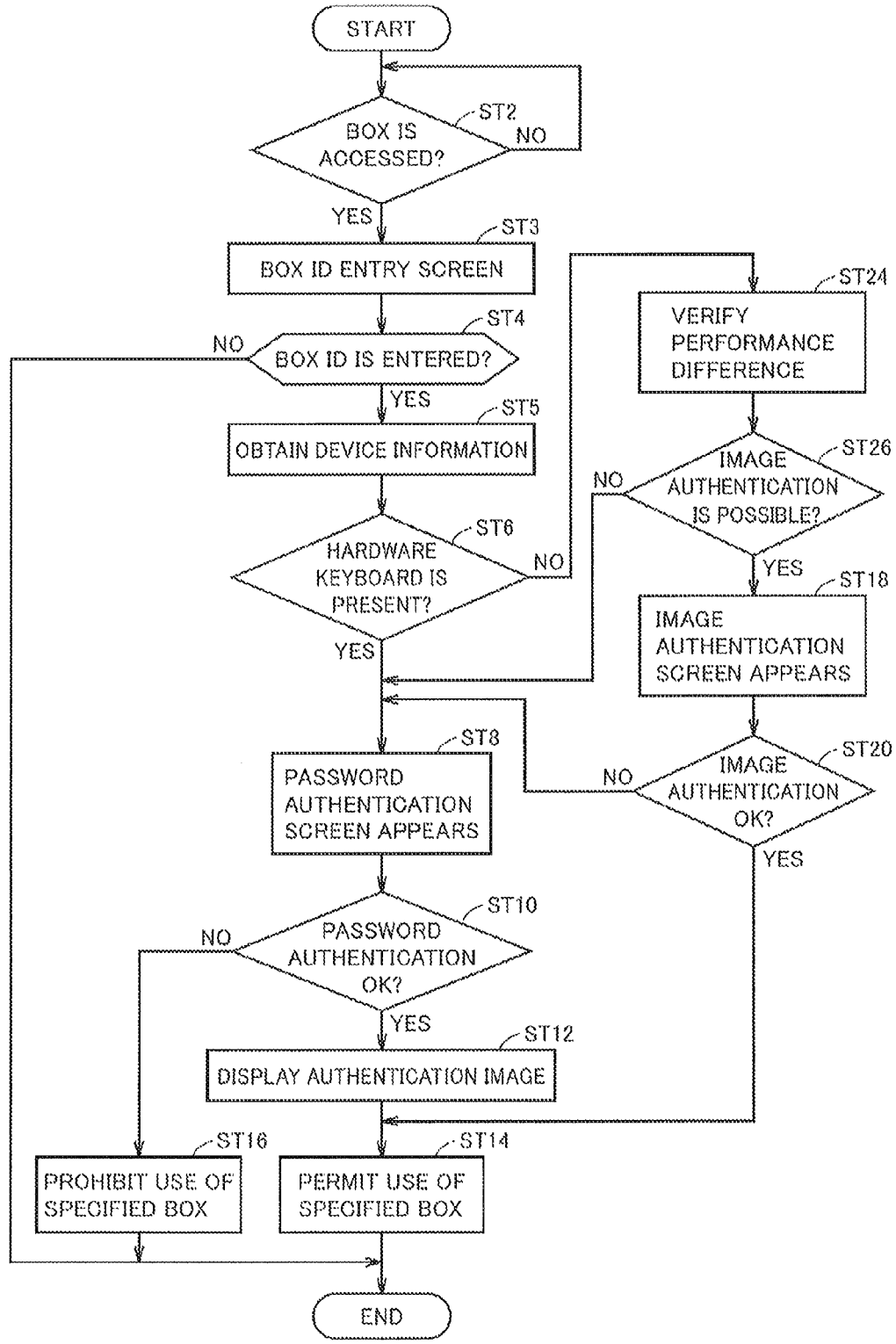
FIG. 20 is a flowchart illustrating an authentication process in accordance with a second modification of the first embodiment of the present invention.

Referring to FIG. 20, the flowchart differs from the flowchart in FIG. 11 in that if no hardware keyboard is present (NO in step ST6) in the determination as to whether a hardware keyboard is present or not in step ST6, the processes in steps ST24 and ST26 are thereafter performed. The other points are similar and therefore a detailed description thereof will not be repeated.

In this modification, after device information is obtained in step ST4, whether a hardware keyboard is present or not is determined in step ST6. CPU 110 can make determination based on the information stored in the device information registration table, as described above.

Then, if it is determined that a hardware keyboard is provided in step ST6 (YES in step ST6), CPU 110 gives an instruction to authentication processing unit 113 so that authentication processing unit 113 displays the password authentication screen (step ST8).

On the other hand, if it is determined that a hardware keyboard is not provided in step ST6, CPU 110 verifies performance differences (step ST24).

Specifically, CPU 110 verifies performance differences based on the information stored in the device information registration table and the attribute information of the authentication image that is specified corresponding to the box ID, if the data is registered in authentication data storage unit 114. For example, in the case where data is registered in authentication data storage unit 114 and where a colored authentication image is registered as attribute information of the authentication image that is specified corresponding to the box ID, if access is made from a device capable of only displaying monochrome images, the colored authentication image cannot be displayed on the above-noted image authentication screen for the device that has made access.

Therefore, after the verification of performance differences in step ST24, it is determined whether image authentication is possible or not (step ST26). Then, if it is determined that image authentication is possible, the process proceeds to step ST18, and the image authentication screen is displayed. The subsequent processes are similar as described above and therefore a detailed description thereof will not be repeated.

On the other hand, after the verification of performance differences, if image authentication is not possible in step ST26 (NO in step ST26), the password authentication screen is displayed (step ST8).

As described above, for example, an authentication image cannot be displayed appropriately on the device that makes access, depending on the attribute information of the authentication image, which is data registered in authentication data storage unit 114. Therefore, whether image authentication is possible or not is determined, and if possible, image authentication is executed, and if impossible, password authentication is executed. According to this technique, if the device that makes access is a device without a hardware keyboard, it is determined whether image authentication can be executed appropriately or not depending on the attributes of the device. If executable, an authentication process is executed with higher priority given to image authentication, and if not executable, an authentication process is performed with higher priority given to password authentication. According to this technique, an appropriate authentication process can be executed depending on the device that makes access.

In this modification, the description has been made to the case where whether image authentication is possible or not is determined based on the comparison between the attribute information of the device, that is, the information as to whether the display format of the display is monochrome or color, and the attribute information of the authentication image as to whether it is monochrome or color. However, the present invention is not limited to such a manner, and the determination can be made based on the comparison between the attribute information such as the gray scale of the display or the display size of the display and the attribute information of the authentication image.

Second Embodiment

In a second embodiment, a description will be made to a technique in which data stored in the authentication data storage unit of MFP 11 is transferred (copied) to another MFP 11a.

Using FIG. 21, an information processing system 2 in accordance with the second embodiment of the present invention will be described.

Figure 21:
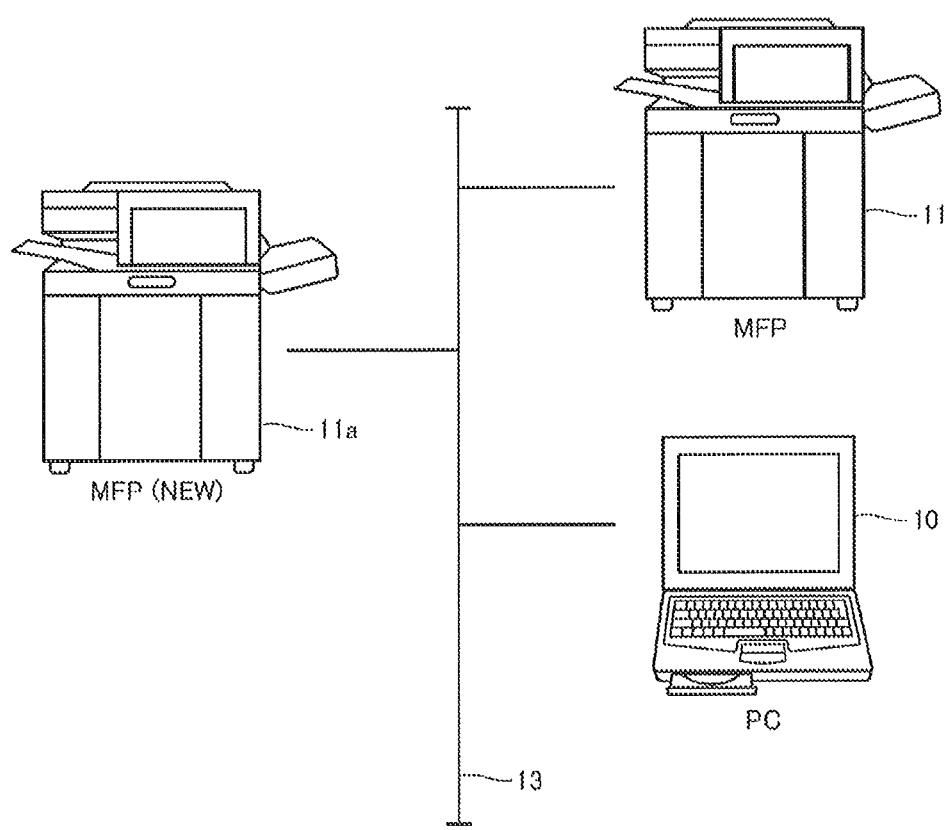
FIG. 21 is a diagram showing an information processing system 2 in accordance with a second embodiment of the present invention.

Referring to FIG. 21, here, a personal computer (also simply referred to as "PC" hereinafter) 10 as a terminal device and MFP 11 are connected with each other via LAN (Local Area Network) 13 as a network. A new MFP 11a is additionally connected to LAN 13.

PC 10, MFP 11, and MFP 11a are connected such that they can communicate data with each other through LAN 13.

In the second embodiment, data in the authentication data storage unit is transferred (copied) to MFP 11a connected with MFP 11 via LAN or the like.

It is noted that although one PC is connected to LAN 13 as a terminal device, the number of terminal devices is not limited to one and more than one device may be connected. In other words, any configuration may be employed as long as MFP 11 can be accessed from a plurality of devices.

The configuration of MFP 11, 11a is similar to the one described in FIG. 2 and therefore a detailed description thereof will not be repeated.

It is noted that, in the initial state, no information is stored in authentication data storage unit 114 of MFP 11a.

Using FIG. 22, a schematic block diagram of PC 10 in accordance with the second embodiment of the present invention will be described.

Figure 22:
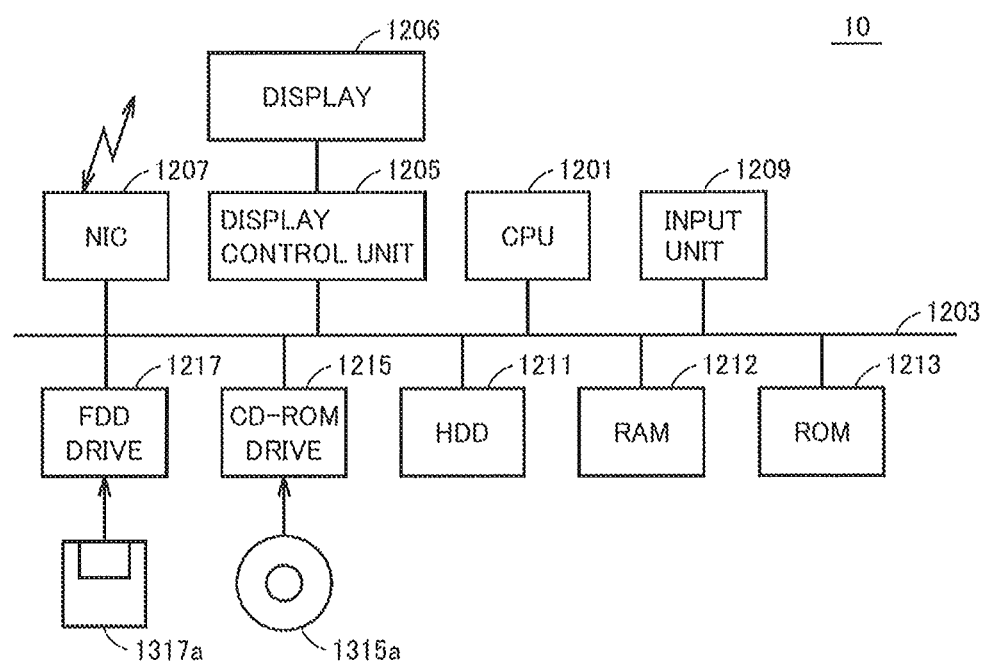
FIG. 22 is a schematic block diagram of a PC 10 in accordance with the second embodiment of the present invention.

Referring to FIG. 22, PC 10 in accordance with the present embodiment is configured with a body unit, display, and input unit.

The display means corresponds to a display 1206. An input unit 1209 is configured to include a keyboard as key input means, a mouse as a pointing device, and the like.

Although it will be described in this embodiment that display 1206 and input unit 1209 are integrally formed, they may be formed separately.

Display 1206 may be a liquid crystal display, a CRT (Cathode Ray Tube) display, a plasma display, or any other display as long as it is capable of display.

The body unit includes a CPU (Central Processing Unit) 1201 for running a variety of programs including an operating system (OS), a RAM 1212 for temporarily storing data necessary for CPU 1201 to run the programs, a hard disk drive (HDD) 1211 for storing programs or data executed in CPU 1201 in a non-volatile manner, and a ROM 1213 in which the programs run by CPU 1201 are stored beforehand. Basic software (OS) is stored beforehand in ROM 1213 or HDD 1211, and execution of the OS allows a variety of applications to run.

A variety of software programs for executing the processing described later are stored in HDD 1211, and the software programs are read by CPU 1201 to realize the processing function as described later.

Such programs are read from a flexible disk 1317a or a CD-ROM 1315a by an FD drive 1217 or a CD-ROM (Compact Disc-Read Only Memory) drive 1215, respectively. The read programs are then stored in HDD 1211 for use.

CPU 1201 receives an instruction from a user through input unit 1209 and outputs a screen output generated by execution of a program to a display control unit 1205.

Display control unit 1205 outputs a screen output to display 1206.

CPU 1201 also transmits information to MFP 11 or the like connected to LAN 13 (or WAN etc.) through a network interface card (NIC) 1207 such as a LAN card.

The above-noted units communicate data with each other through an internal bus 1203.

Using FIG. 23, a process flow between the information terminal device and MFPs in accordance with the second embodiment of the present invention will be described. Here, the information terminal device is PC 10, by way of example.

It is assumed that data is copied from MFP 11 and copied to MFP 11a.

Here, a process of accessing MFP 11 from PC 10 and registering data in the authentication data storage unit into MFP 11a will be described.

First, PC 10 requests MFP information from MFP 11 (sequence sq20). Specifically, CPU 1201 of PC 10 outputs a command for requesting MFP information to MFP 11 in accordance with a prescribed operation instruction from input unit 1209 by the user.

CPU 110 of MFP 11 sends MFP information to PC 10 in response to the MFP information request command from PC 10 (sequence sq21). Specifically, the device performance of MFP 11, for example, information of the display format and size of the operation panel, etc. is transmitted.

CPU 1201 of PC 10 then stores the obtained MFP information of MFP 11, for example, in RAM 1212.

PC 10 then requests authentication data from MFP 11 (sequence sq22). Specifically, CPU 1201 of PC 10 sends an authentication data request command to MFP 11.

MFP 11 receives the authentication data request command from PC 10 and then sends the authentication data (sequence sq23). Specifically, the information stored in authentication data storage unit 114 of MFP 11, user information, authentication image data, password, box information, and the like are transmitted.

PC 10 then requests MFP information from MFP 11a (sequence sq24). Specifically, CPU 1201 of PC 10 outputs a command for requesting MFP information to MFP 11a in accordance with a prescribed operation instruction from input unit 1209 by the user.

CPU of MFP 11a sends MFP information to PC 10 in response to the MFP information request command from PC 10 (sequence sq25). Specifically, the device performance of MFP 11a, for example, information of the display format and size of the operation panel, etc. is transmitted.

CPU 1201 of PC 10 then stores the obtained MFP information of MFP 11a, for example, in RAM 1212.

CPU 1201 of PC 10 then verifies the performance differences between MFP 11 and MFP 11a (sequence sq26).

Using FIG. 24, a performance difference verification table will be described.

Referring to FIG. 24, here, a plurality of items for which performance differences are verified are listed. Specifically, an item of color/monochrome, an item of panel gray scale, an item of presence/absence of keyboard, an item of panel size, and the like are listed as the operation panel information.

In this embodiment, it is assumed that for the item of color/monochrome as the operation panel information, MFP 11 provides color and MFP 11a provides monochrome, by way of example.

For the item of panel gray scale, MFP 11 provides 256 levels and MFP 11a provides 128 levels.

For the item of presence/absence of keyboard, MFP 11 provides a ten-key software keyboard and MFP 11a also provides a ten-key software keyboard.

For the item of panel size, MFP 11 provides 800×400 dots and MFP 11a provides 640×240 dots.

PC 10 determines an invalidation standard of the registered authentication image data based on the above-noted comparison of MFP information stored in RAM 1212 between MFP 11 and MFP 11a.

For the invalidation standard based on this comparison, a software program for determining the standard is stored beforehand in HDD 1211. CPU 1201 loads the software program to set the invalidation standard shown in FIG. 24.

Specifically, for the item of color/monochrome, MFP 11 provides color and MFP 11*a* provides monochrome, so that colored authentication image data is invalidated.

For the item of panel gray scale, MFP 11 provides 256 levels and MFP 11*a* provides 128 levels, so that such authentication image data as natural image that is difficult to discriminate is invalidated.

Discrimination of natural images is a well-known technique, for example, as disclosed in Japanese Laid-Open Patent Publication No. 9-326922, and a detailed description of the technique is not repeated here.

Although the description here has been made to the invalidation standard based on the comparison of color/monochrome and panel gray scale as the operation panel information, the other items are also set similarly.

Referring to FIG. 23 again, CPU 1201 of PC 10 invalidates the authentication data in accordance with the set invalidation standard based on the performance differences between MFP 11, and MFP 11*a* (sequence sq27). Specifically, of the authentication image data included in the authentication data, the authentication image data that meets the invalidation standard is invalidated.

Using FIG. 25, an example in which the authentication data registered in authentication data storage unit 114 is invalidated will be described.

As shown in FIG. 25, the colored authentication image data is invalidated.

Furthermore, such authentication image data as natural image is also invalidated.

Referring to FIG. 23 again, CPU 1201 of PC 10 creates new authentication data based on the invalidated authentication data (sequence sq28).

CPU 1201 of PC 10 then sends the created new authentication data (sequence sq30).

MPF 11*a* then saves the new authentication data sent from PC 10 in authentication data storage unit 114 of MFP 11*a*.

Using FIG. 26, the new authentication data saved in authentication data storage unit 114 of MFP 11*a* will be described.

Referring to FIG. 26, it is shown that the invalidated authentication image data as illustrated in FIG. 25 is deleted, and the other authentication data is saved in authentication data storage unit 114 of MFP 11*a*.

Then, saving of the authentication data in authentication data storage unit 114 allows the user to execute password authentication or image authentication in a similar manner as described in the first embodiment when accessing the box of MFP 11*a*.

When the user not having an authentication image makes access, password authentication is preferentially performed because of the absence of authentication image. Then, if the authentication is successful as a result of the password authentication, an authentication image may be generated at this time in authentication image data generation unit 112 and then registered.

Specifically, an authentication image may be generated and displayed in step ST12 in the flowchart in FIG. 11.

According to this technique, when MFP 11*a* is newly connected to LAN 13, the data stored in the authentication data storage unit of MFP 11 can easily be transferred (copied) to another MFP 11*a*.

At this point, the performances are compared, and if the authentication data is found to be difficult to use, depending on the performance difference, the corresponding authentication data is invalidated and registered.

Accordingly, it can be avoided that the user accesses the box of MPF 11*a* to execute image authentication and finds it difficult to select the object image as, for example, a colored object image is displayed in monochrome due to the performance difference.

In other words, the data in the authentication data storage unit is customized to the performance of MFP in use and is then transferred, thereby offering convenience to the users.

Figure 23:
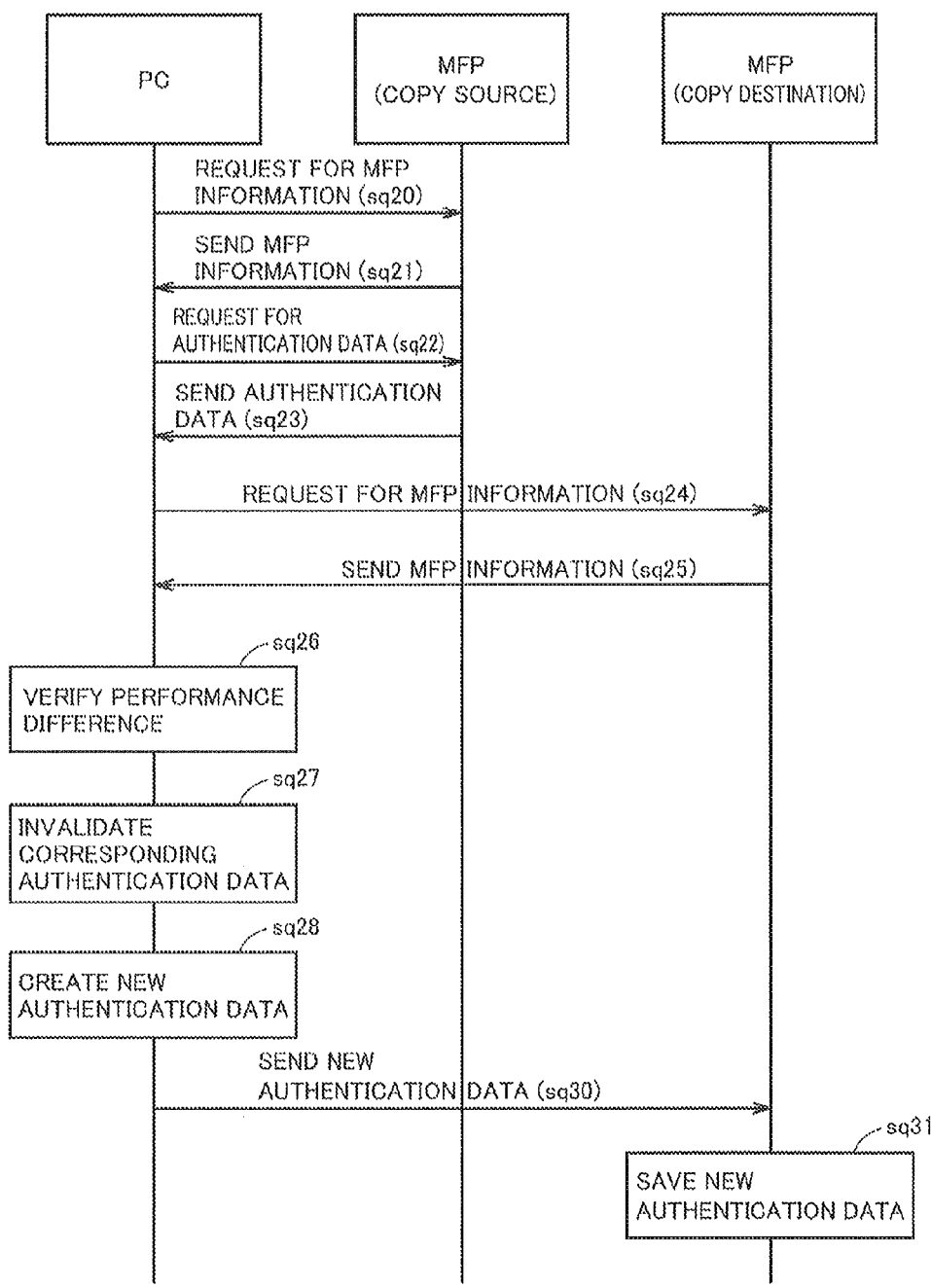
FIG. 23 is a diagram showing a process flow between an information terminal device and MFPs in accordance with the second embodiment of the present invention.

Although in FIG. 23, PC makes a request for MFP information and performs the performance difference verification and the like, the process performed by PC may be performed in MFP (copy source). Specifically, the MFP may make a request for information of the copy destination MFP, receive the MFP information, verify the performance differences, and then generate and send new authentication data to the copy destination MFP.

Third Embodiment

In a third embodiment, a technique in which an object image for use in image authentication is generated in authentication image data generation unit 112 will be described.

In this embodiment, a character input as a password is designed and converted into an authentication image in authentication image data generation unit 112.

Using FIG. 27, a table for designing and converting a password (character) into an image will be described.

Referring to FIG. 27, it is shown here that alphabets A, . . . , numbers 1, . . . , and symbols @, -, +, etc. are designed and converted into images.

Using FIG. 28, image processing performed on the designed images will be described.

Referring to FIG. 28, here, the images formed by designing characters A, B, C are further subjected to image processing.

The image processing makes it difficult for others to distinguish what is written, thereby enhancing the security. A well-known technique may be used in the image processing. The image processing can be performed easily, for example, using image editing software such as Photoshop (R) from Adobe Systems Incorporated.

Using FIG. 29, an authentication image confirmation screen 700 in accordance with the third embodiment of the present invention will be described.

Figure 29:
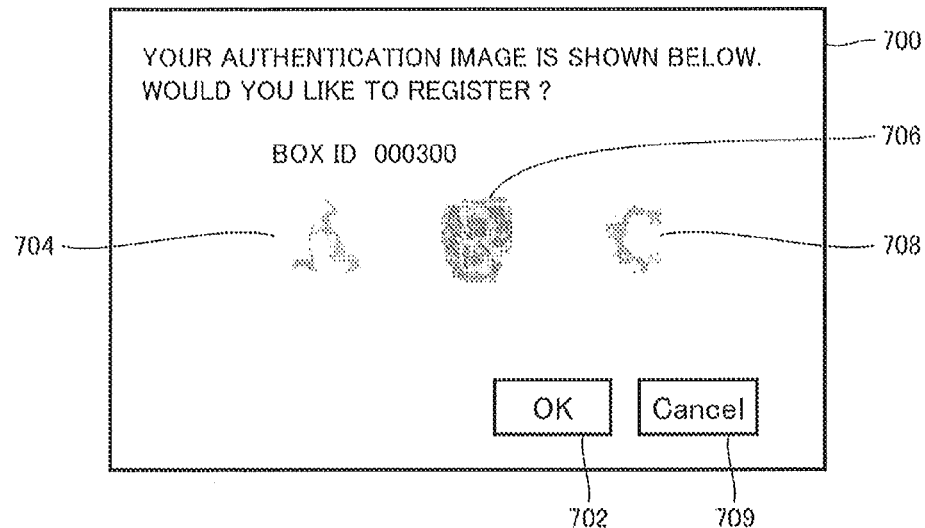
FIG. 29 shows an authentication image confirmation screen 700 in accordance with a third embodiment of the present invention.

Referring to FIG. 29, here, authentication image confirmation screen 700 is shown. On this screen, "Your authentication image is shown below. Would you like to register?" appears together with the box information "ID000300" and object images 704, 706, 708 generated by designing characters "A," "B," "C" in authentication image data generation unit 112.

Then, in the lower region of the screen, an "OK" button 702 and a "Cancel" button 709 are provided. When the user specifies "OK" button 702, data is output to MFP 11 to indicate that the displayed object images 704, 706, 708 are confirmed as authentication images.

Using FIG. 30, an image authentication screen displayed by authentication processing unit 113 in accordance with the third embodiment of the present invention will be described.

Figure 30:
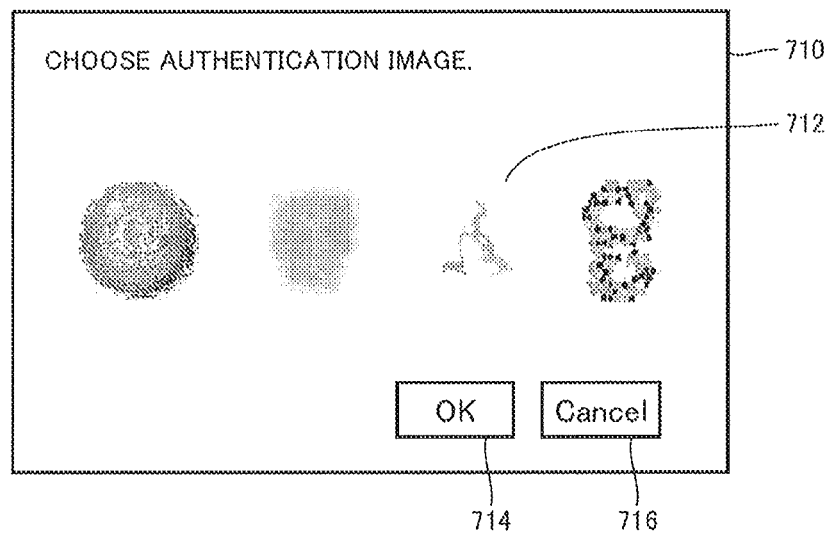
FIG. 30 shows an image authentication screen displayed by authentication processing unit 113 in accordance with the third embodiment of the present invention.

Referring to FIG. 30, an image authentication screen 710 displayed by authentication processing unit 113 is shown.

Image authentication screen 710 includes the user's own authentication image among a plurality of object images. The user specifies his/her own authentication image from among the plurality of object images and specifies an "OK" button 714 to initiate an authentication process.

Specifically, authentication processing unit 113 places the authentication image stored corresponding to the specified box ID and other dummy images on image authentication screen 710. Here, for example, an object image 712 corresponding to the box ID 000300 and other dummy images are placed. It is noted that there are three authentication images as described above and only the object image for "A" is placed here.

Although four object images are placed here, the number of object images is not limited as long as more than one image is displayed. The security can be enhanced by increasing the number of images.

The placed dummy images are selected from a plurality of object images stored beforehand in HDD or the like.

Image authentication is initiated by specifying the "OK" button. In this embodiment, when object image 712 is specified and the "OK" button is specified, the next image authentication screen appears. For example, the screen including the object image for "B" as described above and dummy images appears. Then, after the object image for "B" is specified in the similar manner, the screen including the object image for "C" and dummy images further appears. Then, when the object image for "C" is specified in the similar manner, "A," "B," "C" are specified as authentication images, so that the authentication is successful.

It is noted that authentication may be failed with even one mistake.

When authentication images are presented to the user from among images stored beforehand in HDD, authentication image data generation unit 112 needs to store a plurality of images in HDD. However, according to the present technique, object images formed by designing and processing a password (characters) entered by the user are used as authentication images, so that the number of authentication images stored in HDD can be reduced, and authentication images can be generated easily.

In addition, conveniently, the user can easily remember the authentication images since the password (characters) entered by the user is displayed as authentication images.

In this embodiment, although it has been described that authentication images are selected three times, for example, "A," "B," "C" can be specified as authentication images on a single screen, as a matter of course. In such a case, the order of specification may be stored.

First Modification of Third Embodiment

In the foregoing third embodiment, it has been described that characters are designed and converted into images. However, characters may not be simply designed but may be converted into an image related to the meaning of a word (characters), if the word has meaning.

Figure 31:
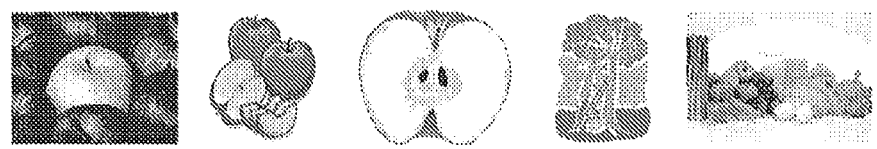
FIG. 31 shows exemplary images in a case where a password has meaning.

Using FIG. 31, an example of images in a case where a password has meaning will be described.

Here, in a case where a password is "apple," images associated with the password are listed.

The images associated with a password are presented as authentication images in this way, so that it is convenient for the user to easily remember the authentication image.

The images associated with a word may be stored beforehand in HDD.

Although a plurality of images associated with "apple" are listed here, one of them may be presented.

The images associated with "apple" may be changed and presented for every authentication.

In this modification, although it has been described that images are stored beforehand in HDD, the images may not be held in MFP 11 and images may be generated easily by externally obtaining images through a network.

For example, in a case where authentication images are stored in PC 12A in the configuration as shown in FIG. 1, authentication image data generation unit 112 of MFP 11 retrieves the image associated with the password "apple" through the network thereby easily generating and presenting the image. The retrieval of images is a well-known technique and therefore a detailed description thereof is not repeated here.

Second Modification of Third Embodiment

In the foregoing first modification of the third embodiment, one word is designed and converted into an image. However, for example, words in a text may be associated with each other and then converted into images.

For example, it is assumed that a password "Trees in that mountain turn red" is entered.

For example, the text is segmented, so that the words that agree with vocabularies registered in HDD or the like are extracted.

It is noted that a well-known technique may be used to segment a text.

In this example, "Trees" "mountain" "turn red" agree with the registered vocabularies. Here, "Trees" is the plural form of "Tree" and therefore is treated as the singular form, for the sake of brevity.

Using FIGS. 32A, 32B, 32C, exemplary images in a case where a password has meaning in accordance with the third embodiment of the present invention will be described.

Figure 32A:
FIGS. 32A, 32B, and 32C show exemplary images in a case where a password has meaning in accordance with the third embodiment of the present invention.

Referring to FIG. 32A, here, an image mainly corresponding to "Trees" is shown.

Figure 32B:
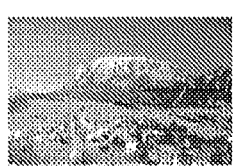

Referring to FIG. 32B, here, an image mainly corresponding to "mountain" is shown.

Figure 32C:
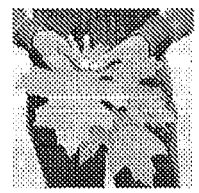

Referring to FIG. 32C, here, an image mainly corresponding to "turn red" is shown. It is noted that although an image of a leaf is shown here, the image is in red. The parenthesized term "red" is shown for reference and may not be displayed in the actual image.

Using FIG. 33, an image authentication screen displayed by authentication processing unit 113 in accordance with a second modification of the third embodiment of the present invention will be described.

Figure 33:
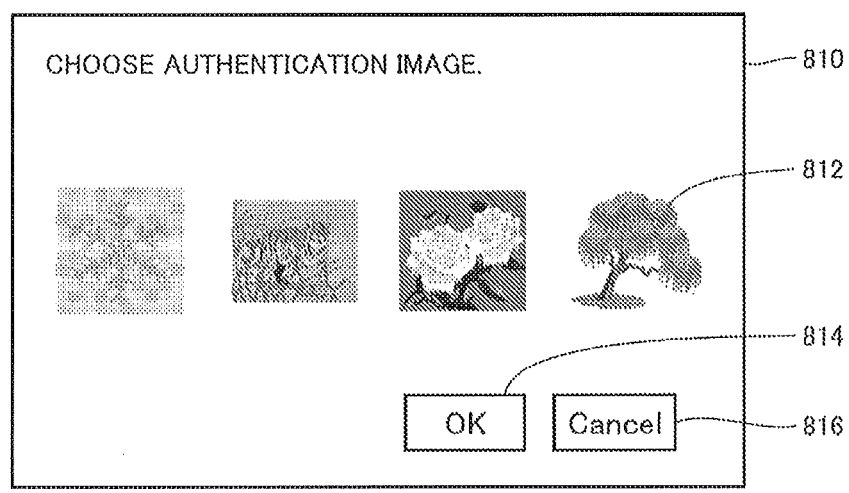
FIG. 33 shows an image authentication screen displayed by authentication processing unit 113 in accordance with a second modification of the third embodiment of the present invention.

Referring to FIG. 33, an image authentication screen 810 displayed by authentication processing unit 113 is shown.

Image authentication screen 810 includes the user's own authentication image among a plurality of object images. The user specifies his/her own authentication image from among the plurality of object images and specifies an "OK" button 814 to initiate an authentication process.

Specifically, authentication processing unit 113 places an authentication image (password image) stored corresponding to the specified box ID and other dummy images on image authentication screen 810. Here, for example, an object image 812 corresponding to "Trees" described above and other dummy images are placed. It is noted that there are three authentication images as described above and here only the object image for "Trees" is placed.

Although it is shown here that four object images are placed, the number of the object images is not limited as long as more than one image is placed. The security can be enhanced by increasing the number of images.

The placed dummy images are selected from among a plurality of object images stored beforehand in HDD or the like.

Then, image authentication is initiated by specifying an "OK" button 814. In this example, when object image 812 is specified and the "OK" button is specified, the next image authentication screen appears.

Using FIG. 34, another example of an image authentication screen displayed by authentication processing unit 113 in accordance with the second modification of the third embodiment of the present invention will be described.

Figure 34:
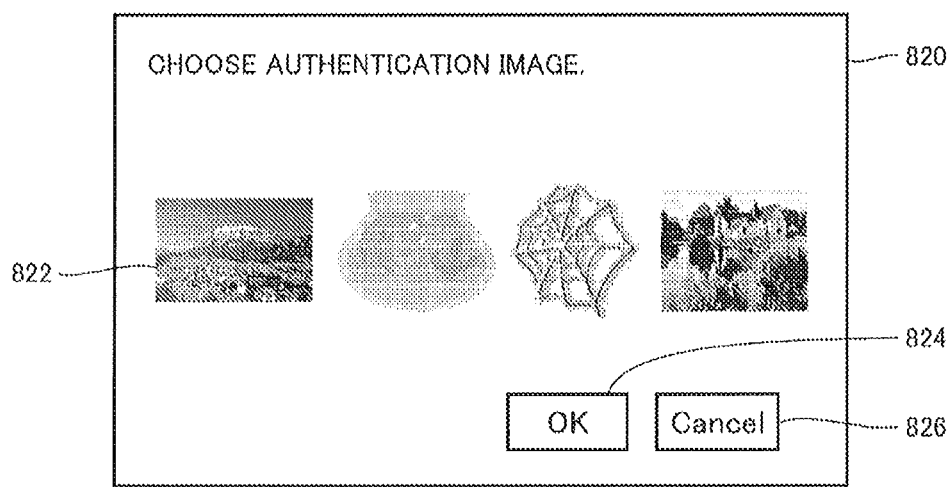
FIG. 34 shows another example of the image authentication screen displayed by authentication processing unit 113 in accordance with the second modification of the third embodiment of the present invention.

Referring to FIG. 34, an image authentication screen 820 displayed by authentication processing unit 113 is shown.

Specifically, authentication processing unit 113 places an authentication image (password image) stored corresponding to the specified box ID and other dummy images on image authentication screen 820. Here, for example, an object image 822 corresponding to "mountain" described above and other dummy images are placed. It is noted that there are three authentication images as described above and here only the object image for "mountain" is placed.

Then, image authentication is initiated by specifying an "OK" button 824. In this example, when object image 822 is specified and the "OK" button is specified, the next image authentication screen appears.

Using FIG. 35, yet another example of an image authentication screen displayed by authentication processing unit 113 in accordance with the second modification of the third embodiment of the present invention will be described.

Figure 35:
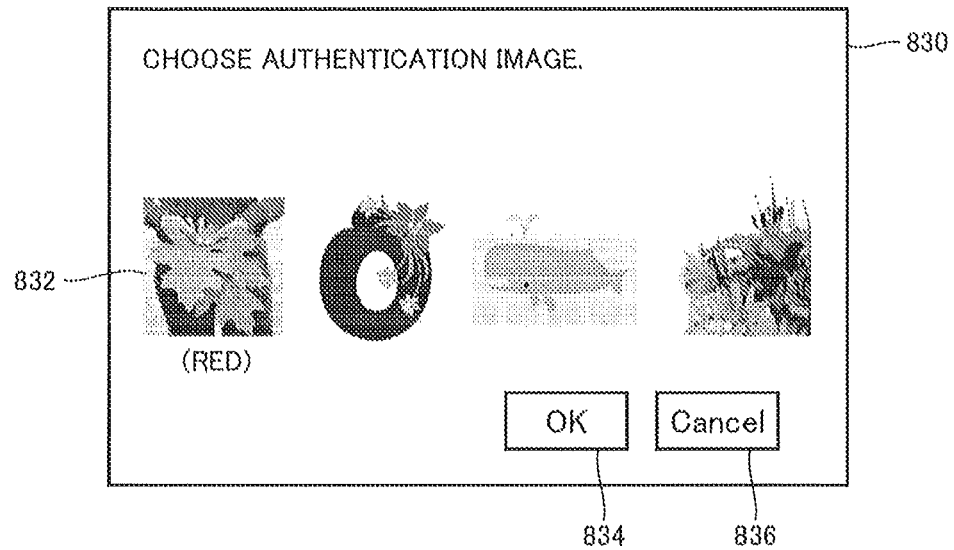
FIG. 35 shows yet another example of the image authentication screen displayed by authentication processing unit 113 in accordance with the second modification of the third embodiment of the present invention.

Referring to FIG. 35, an image authentication screen 830 displayed by authentication processing unit 113 is shown.

Specifically, authentication processing unit 113 places an authentication image (password image) stored corresponding to the specified box ID and other dummy images on image authentication screen 830. Here, for example, an object image 832 corresponding to "turn red" described above and other dummy images are placed. It is noted that there are three authentication images as described above and here only the object image for "turn red" is placed.

Then, image authentication is initiated by specifying an "OK" button 834. In this example, when object image 832 is specified and the "OK" button is specified, the next image authentication screen appears.

Through this process, for example, images corresponding to "trees," "mountain," "turn red" are specified as authentication images so that the authentication is successful.

It is noted that the authentication may be failed with even one mistake.

According to this technique, an image associated with a password is presented as an authentication image, so that it is convenient for the user to easily remember the authentication image.

In this modification, although it has been described that authentication images are selected three times, for example, "trees," "mountain," "turn red" can be specified as authentication images on a single screen, as a matter of course.

Using FIG. 36, a further specific example of image authentication screen displayed by authentication processing unit 113 in accordance with the second modification of the third embodiment of the present invention will be described.

Figure 36:
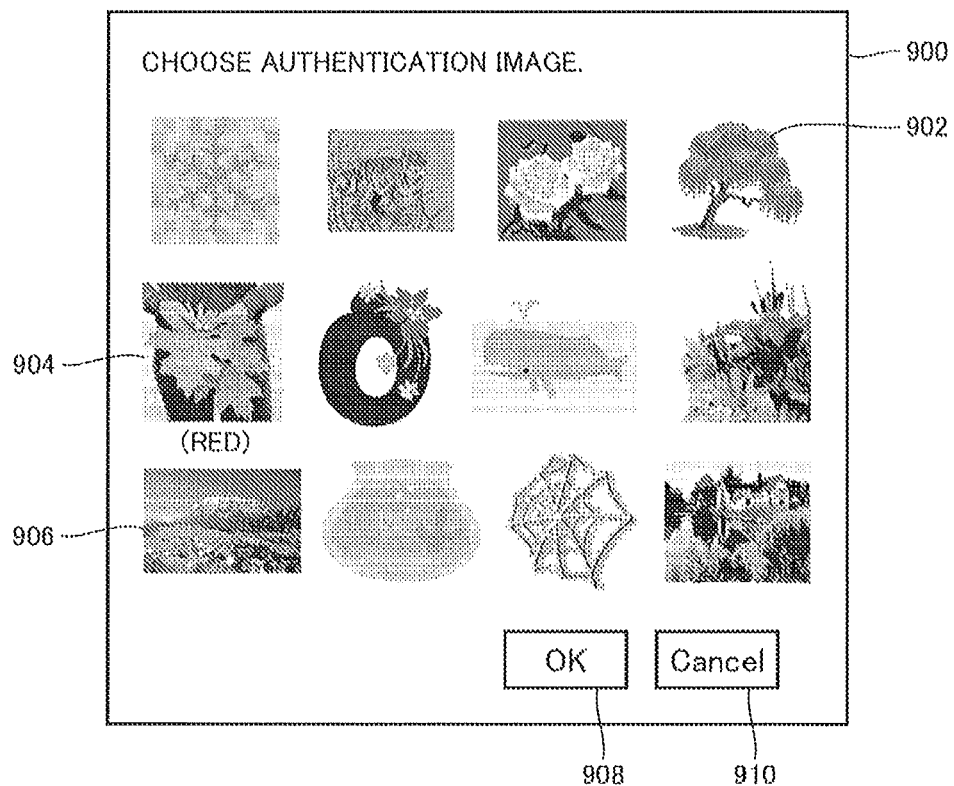
FIG. 36 shows another specific example of the image authentication screen displayed by authentication processing unit 113 in accordance with the second modification of the third embodiment of the present invention.

Referring to FIG. 36, here, it is shown that an object image 902 corresponding to "trees," an object image 906 corresponding to "mountain," an object image 904 corresponding to "turn red," and any other dummy images are placed.

Here, the user specifies the images corresponding to "trees," "mountain," and "turn red" as authentication images by specifying object images 902, 906, 904, so that the authentication is successful.

It is noted that the user may be asked to specify the images in order or may simply specify three images.

Although in the foregoing description all the images are specified, an authentication success may be achieved by specifying any one of object images 902, 904, 906.

It is noted that the images may be stored beforehand in HDD of MFP 11 as described above or may be obtained through an external network, as a matter of course.

It is noted that, for each unit that controls the apparatus as described above, a program may be provided which allows a computer to function to execute the control as described in the above-noted flows. Such a program may be recorded in a computer readable recording medium such as a flexible disk, a CD-ROM (Compact Disk-Read Only Memory), a ROM (Read Only Memory), a RAM (Random Access Memory), and a memory card, which accompanies a computer, and be provided as a program product. Alternatively, the program may be recorded in a recording medium such as a hard disk contained in a computer. Alternatively, the program may be downloaded via a network.

The program may allow the process to be executed by invoking necessary modules, among program modules provided as a part of Operating System (OS) of a computer, in a prescribed sequence at a prescribed timing. In this case, the aforementioned modules are not included in the program itself and the process is executed in cooperation with OS. The program that does not include such modules may also be included in the program in accordance with the present invention.

Furthermore, the program in accordance with the present invention may be built in a part of another program. In this case, the modules included in another program are not included in the program itself, and the process is executed in cooperation with another program. Such a program built in another program may also be included in the program in accordance with the present invention.

The program product to be provided is installed in a program storage portion such as a hard disk for execution. It is noted that the program product includes the program itself and a recording medium having the program recorded thereon.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An information processing apparatus, comprising:
a hardware processor, wherein the hardware processor is configured to implement the following control units:
a first processing unit configured to accept an access from each of a plurality of different kinds of connectable operation devices, wherein the connectable operation devices each comprise a display device,
a device information obtaining unit configured to receive information relating to a display format of the display device of an operation device of said plurality of different kinds of connectable operation devices,
a generating unit configured to generate an authentication image suitable for the display format of the display device of said operation device, wherein said authentication image is based on said received information relating to the display format of the display device of said operation device, wherein the generated authentication image is to be displayed on the display device of said operation device together with a number of images, and
a second processing unit configured to (i) accept a selection of an authentication image from the number of images displayed on said display device, in response to access from said operation device, wherein said selection is provided by an input to said operation device, and (ii) execute an image authentication process based on an agreement between said selected authentication image and a stored authentication image, and wherein the information relating to the display format includes (i) information of a display size of the display device of the operation device and (ii) information of a colored display or a monochrome display of the display device of the operation device.

2. The information processing apparatus according to claim 1, wherein said information relating to a display format further includes information concerning gray scale of said display device of said operation device.

3. The information processing apparatus according to claim 1, further comprising a first storing unit for storing, in a memory, an authentication image generated by said generating unit, wherein said memory stores information relating to a display format of said authentication image with said authentication image.

4. The information processing apparatus according to claim 3, further comprising a second storing unit for storing at least one image, other than an authentication image generated by said generating unit, which is included in said number of images.

5. The information processing apparatus according to claim 1, wherein the authentication image generated based on the received information relating to the display format of the display device of the operation device possesses different display characteristics than a second authentication image generated for the display format of the display device of a second operation device.

6. The information processing apparatus according to claim 5, wherein the different display characteristics of the authentication image and the second authentication image are a monochrome image and a color image.

7. The information processing apparatus according to claim 5, wherein the different display characteristics of the authentication image and the second authentication image are a different image size.

8. A control method for an information processing apparatus, comprising the steps of:

accepting an access to said information processing apparatus from each of a plurality of different kinds of connectable operation devices, wherein the connectable operation devices each comprise a display device, receiving, from an operation device of said plurality of different kinds of connectable operation devices, information relating to a display format of the display device of the operation device, generating an authentication image suitable for the display format of the display device of said operation device, wherein said authentication image is based on said received information relating to the display format of said display device of said operation device, wherein the generated authentication image is to be displayed on the display device of said operation device together with a number of images, accepting a selection of an authentication image from the number of images, in response to access from said operation device, wherein said selection is provided by an input to said operation device, and executing an image authentication process based on an agreement between said selected authentication image and a stored authentication image, wherein the information relating to the display format includes (i) information of a display size of the display device of the operation device and (ii) information of a colored display or a monochrome display of the display device of the operation device.

9. A control method for an information processing apparatus according to claim 8, further comprising the step of storing, in a memory, an authentication image generated by said generating step which corresponds to an operation device that obtains access to the information processing apparatus.

10. A control method for an information processing apparatus according to claim 9, wherein said method further includes the steps of:

transmitting an array of images including said generated authentication image stored in said memory and at least one other image, different from said authentication image, to present said number of images on the display device of the operation device, and accepting a selection of an image from the images displayed in said array, from said operation device.

11. A non-transitory computer-readable storage medium storing a control program for causing a computer of an information processing apparatus to execute processing including the steps of:

accepting an access to said information processing apparatus from each of a plurality of different kinds of connectable operation devices, wherein the connectable operation devices each comprise a display device, receiving, from an operation device of said plurality of different kinds of connectable operation devices, information relating to a display format of the display device of the operation device, generating an authentication image suitable for the display format of the display device of said operation device, wherein said authentication image is based on said received information relating to the display format of the display device said operation device, wherein the generated authentication image is to be displayed on the display device of said operation device together with a number of images, accepting a selection of an authentication image from the number of images, in response to access from said operation device, wherein said selection is provided by an input to said operation device, and executing an image authentication process based on an agreement between said selected authentication image and a stored authentication image, wherein the information relating to the display format includes (i) information of a display size of the display device of the operation device and (ii) information of a colored display or a monochrome display of the display device of the operation device.

12. A non-transitory computer-readable storage medium according to claim 11, said control program further causing said computer to execute the step of storing, in a memory, an authentication image generated by said generating step, which corresponds to an operation device that makes access to the information processing device.

13. A non-transitory computer-readable storage medium according to claim 12, said control program further causing said computer to execute the steps of:

transmitting, said generated authentication image stored in said memory and at least one other image, different from said authentication image, in an array to present said number of images on a display of an operation device, and accepting a selection of an image from the images displayed in the array by said, from said operation device.

* * * * *